US012621049B2

(12) United States Patent
Zhang et al.

(10) Patent No.:  US 12,621,049 B2
(45) Date of Patent:      May 5, 2026

(54) TRANSMIT DIVERSITY ACROSS ORBITAL ANGULAR MOMENTUM MODES

(71) Applicant: QUALCOMM Incorporated, San Diego, CA (US)

(72) Inventors: Danlu Zhang, San Diego, CA (US); Min Huang, Beijing (CN); Yu Zhang, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 261 days.

(21) Appl. No.: 18/563,322

(22) PCT Filed: Jul. 13, 2021

(86) PCT No.: PCT/CN2021/105924

§ 371 (c)(1),
(2) Date: Nov. 21, 2023

(87) PCT Pub. No.: WO2023/283798

PCT Pub. Date: Jan. 19, 2023

(65) Prior Publication Data

US 2024/0223267 A1      Jul. 4, 2024

(51) Int. Cl.
H04W 48/10      (2009.01)
H04B 7/06      (2006.01)
H04B 7/185      (2006.01)

(52) U.S. Cl.
CPC ......... H04B 7/18563 (2013.01); H04B 7/068 (2013.01)

(58) Field of Classification Search
CPC . H04B 7/18563; H04B 7/068; H04B 7/18506
(Continued)

(56) References Cited

U.S. PATENT DOCUMENTS 9,031,151 B1      5/2015  Harris et al.
10,348,394 B1 *  7/2019  Bakr ................... H04L 12/4625
(Continued)

FOREIGN PATENT DOCUMENTS

CN      110138438 A      8/2019
CN      111133698 A      5/2020
(Continued)

OTHER PUBLICATIONS

International Search Report and Written Opinion—PCT/CN2021/105924—ISA/EPO—Feb. 25, 2022.

*Primary Examiner* — Tanmay K Shah
(74) *Attorney, Agent, or Firm* — Paul M. McAdams; Holland & Hart LLP

(57)      ABSTRACT

Methods, systems, and devices for determining a transmit diversity across orbital angular momentum (OAM) modes are described. In some examples, a first device may select a subset of OAM modes for a transmit diversity scheme associated with communications between the first device and a second device. The first device may transmit an indication of the transmit diversity scheme, where the transmit diversity scheme may indicate the subset of OAM modes to the second device. The first device may then transmit signaling (e.g., a data packet, one or more signals, a data stream) to the second device using a set of transmitter circles of the first device. In response, the second device may transmit a feedback message, indicating signal strength measurements associated with one or more OAM modes. The first device may determine a set of OAM modes to use for subsequent signaling based on the feedback message.

30 Claims, 19 Drawing Sheets

(58) Field of Classification Search
USPC ......................................................... 455/427
See application file for complete search history.

(56) References Cited

U.S. PATENT DOCUMENTS

| 2017/0170574 A1* | 6/2017 | Sacco | .................. H01Q 21/205 |
| 2017/0187442 A1* | 6/2017 | Luddy | ..................... H04J 11/00 |
| 2021/0105049 A1 | 4/2021 | Zenkyu et al. | |

FOREIGN PATENT DOCUMENTS

| WO | WO-2021093321 A1 * | 5/2021 | ........... H04B 7/0617 |
| WO | WO-2021128022 A1 | 7/2021 | |

* cited by examiner 205-b 210-b

Figure 6:
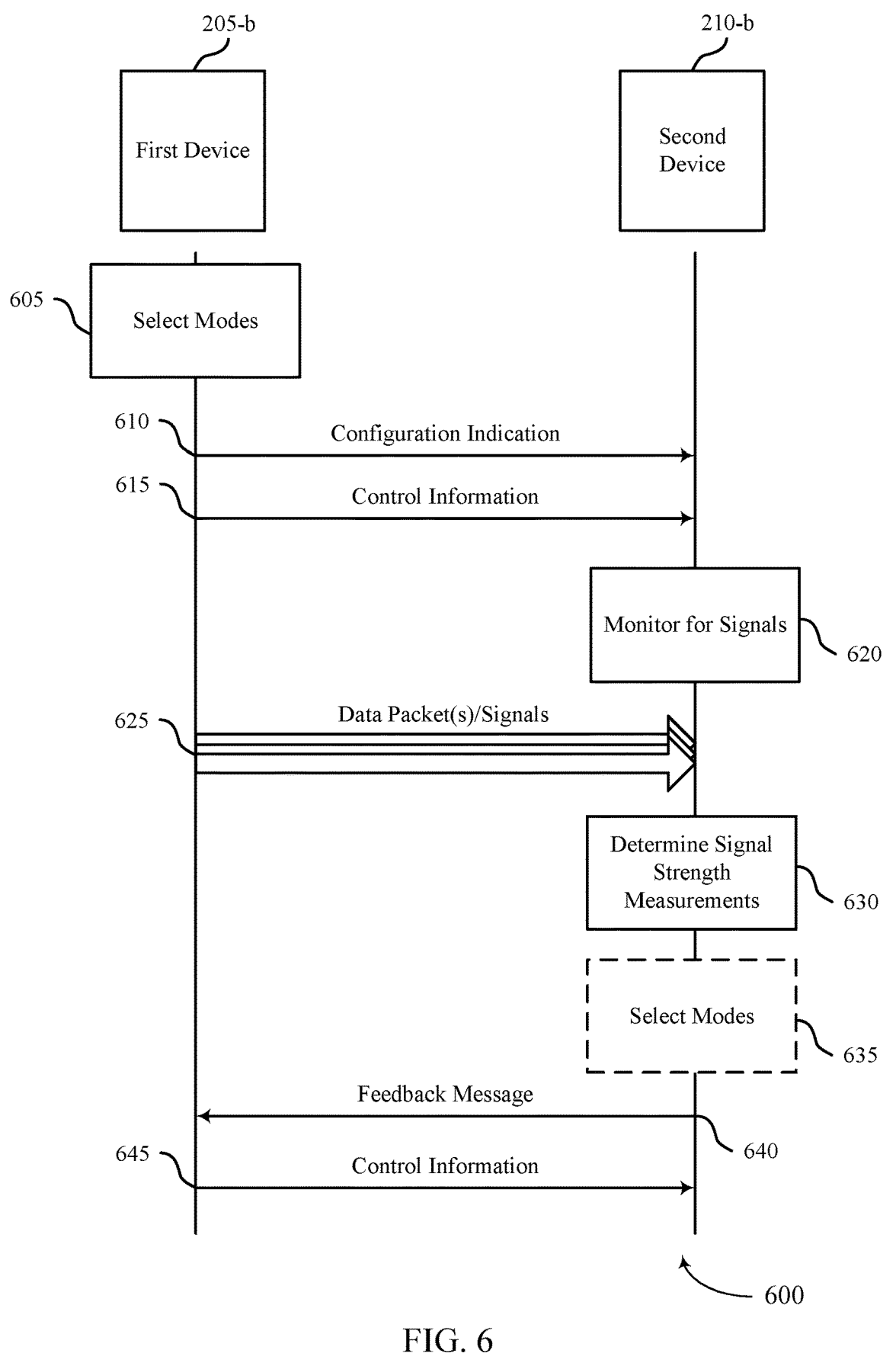

First Device

Second Device

605 — Select Modes

610 — Configuration Indication →

615 — Control Information →

Monitor for Signals — 620

625 — Data Packet(s)/Signals ⇒

Determine Signal Strength Measurements — 630

Select Modes — 635

← Feedback Message

640

645 — Control Information →

Figure 12:
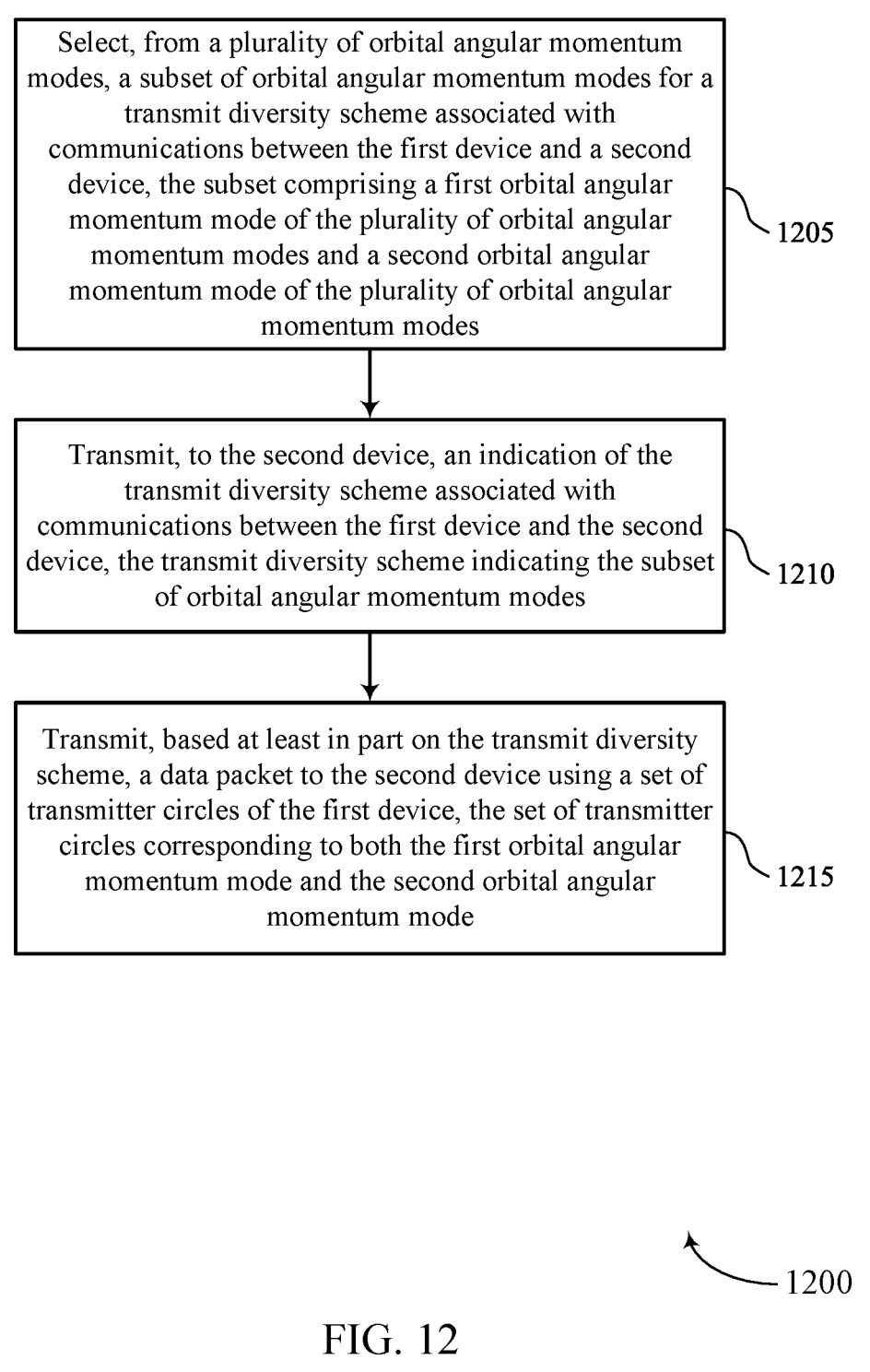

Select, from a plurality of orbital angular momentum modes, a subset of orbital angular momentum modes for a transmit diversity scheme associated with communications between the first device and a second device, the subset comprising a first orbital angular momentum mode of the plurality of orbital angular momentum modes and a second orbital angular momentum mode of the plurality of orbital angular momentum modes

1205

Transmit, to the second device, an indication of the transmit diversity scheme associated with communications between the first device and the second device, the transmit diversity scheme indicating the subset of orbital angular momentum modes

1210

Transmit, based at least in part on the transmit diversity scheme, a data packet to the second device using a set of transmitter circles of the first device, the set of transmitter circles corresponding to both the first orbital angular momentum mode and the second orbital angular momentum mode

Figure 13:
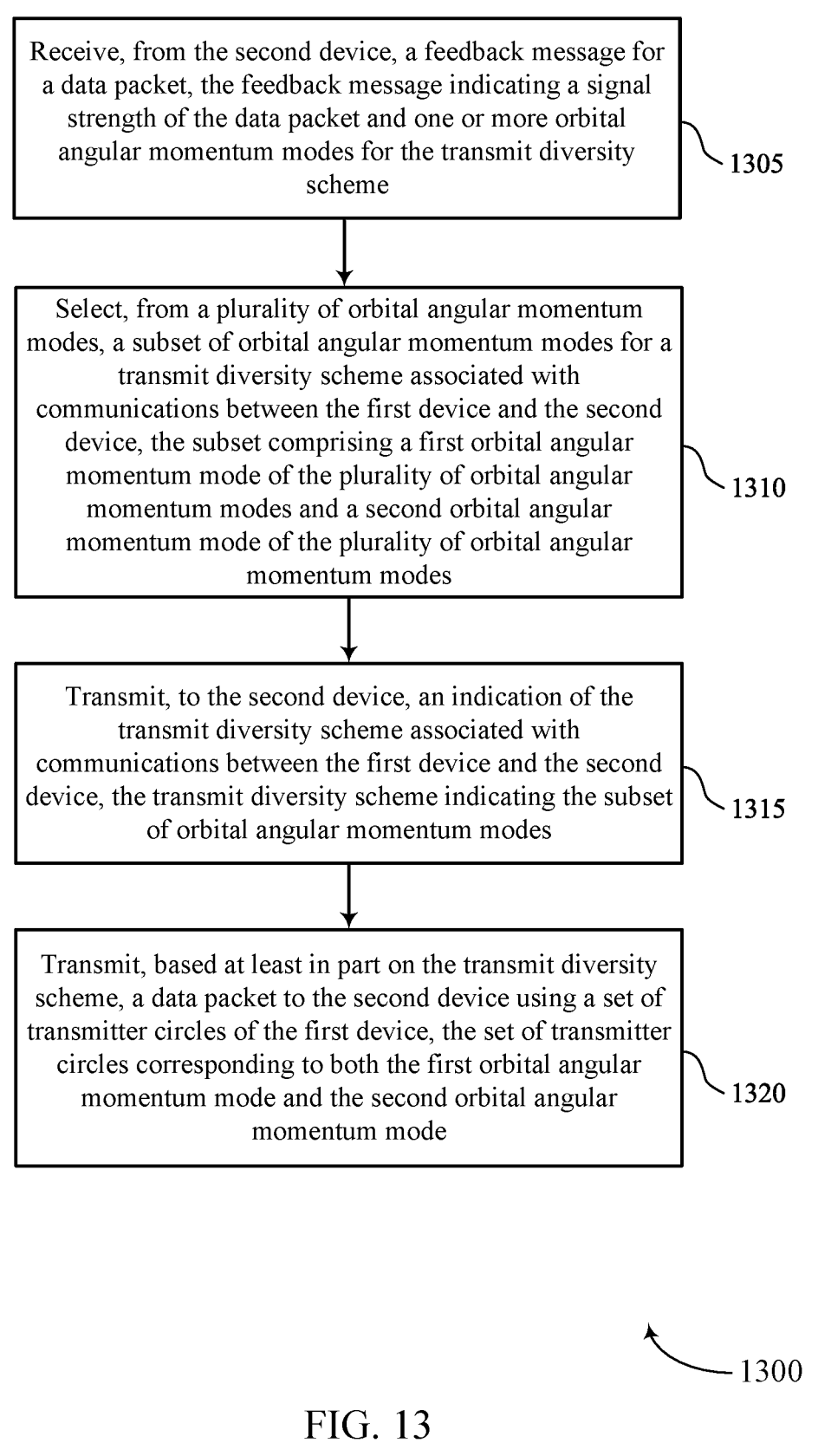

Receive, from the second device, a feedback message for a data packet, the feedback message indicating a signal strength of the data packet and one or more orbital angular momentum modes for the transmit diversity scheme

1305

Select, from a plurality of orbital angular momentum modes, a subset of orbital angular momentum modes for a transmit diversity scheme associated with communications between the first device and the second device, the subset comprising a first orbital angular momentum mode of the plurality of orbital angular momentum modes and a second orbital angular momentum mode of the plurality of orbital angular momentum modes

1310

Transmit, to the second device, an indication of the transmit diversity scheme associated with communications between the first device and the second device, the transmit diversity scheme indicating the subset of orbital angular momentum modes

1315

Transmit, based at least in part on the transmit diversity scheme, a data packet to the second device using a set of transmitter circles of the first device, the set of transmitter circles corresponding to both the first orbital angular momentum mode and the second orbital angular momentum mode

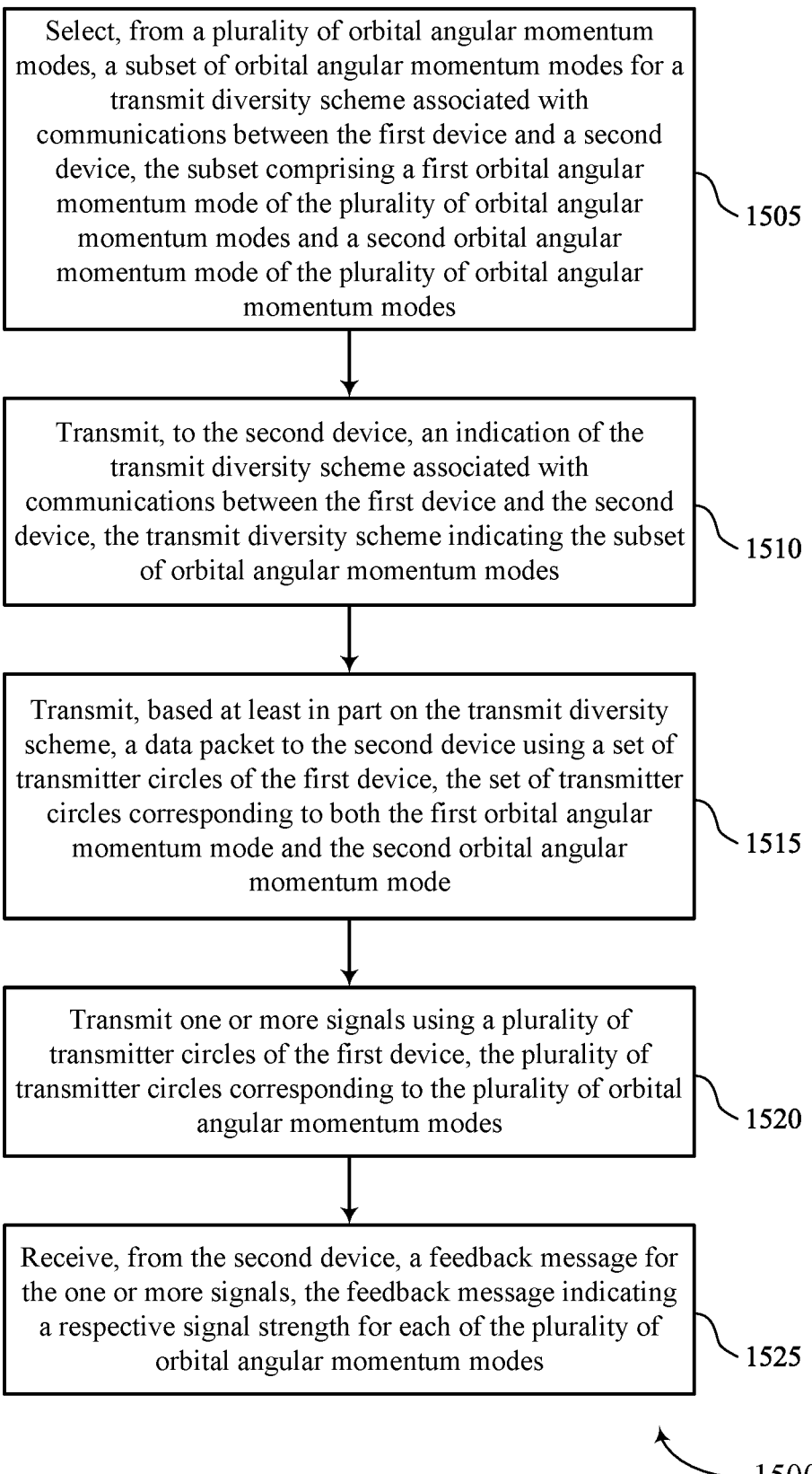

Select, from a plurality of orbital angular momentum modes, a subset of orbital angular momentum modes for a transmit diversity scheme associated with communications between the first device and a second device, the subset comprising a first orbital angular momentum mode of the plurality of orbital angular momentum modes and a second orbital angular momentum mode of the plurality of orbital angular momentum modes

1505

Transmit, to the second device, an indication of the transmit diversity scheme associated with communications between the first device and the second device, the transmit diversity scheme indicating the subset of orbital angular momentum modes

1510

Transmit, based at least in part on the transmit diversity scheme, a data packet to the second device using a set of transmitter circles of the first device, the set of transmitter circles corresponding to both the first orbital angular momentum mode and the second orbital angular momentum mode

1515

Transmit one or more signals using a plurality of transmitter circles of the first device, the plurality of transmitter circles corresponding to the plurality of orbital angular momentum modes

1520

Receive, from the second device, a feedback message for the one or more signals, the feedback message indicating a respective signal strength for each of the plurality of orbital angular momentum modes

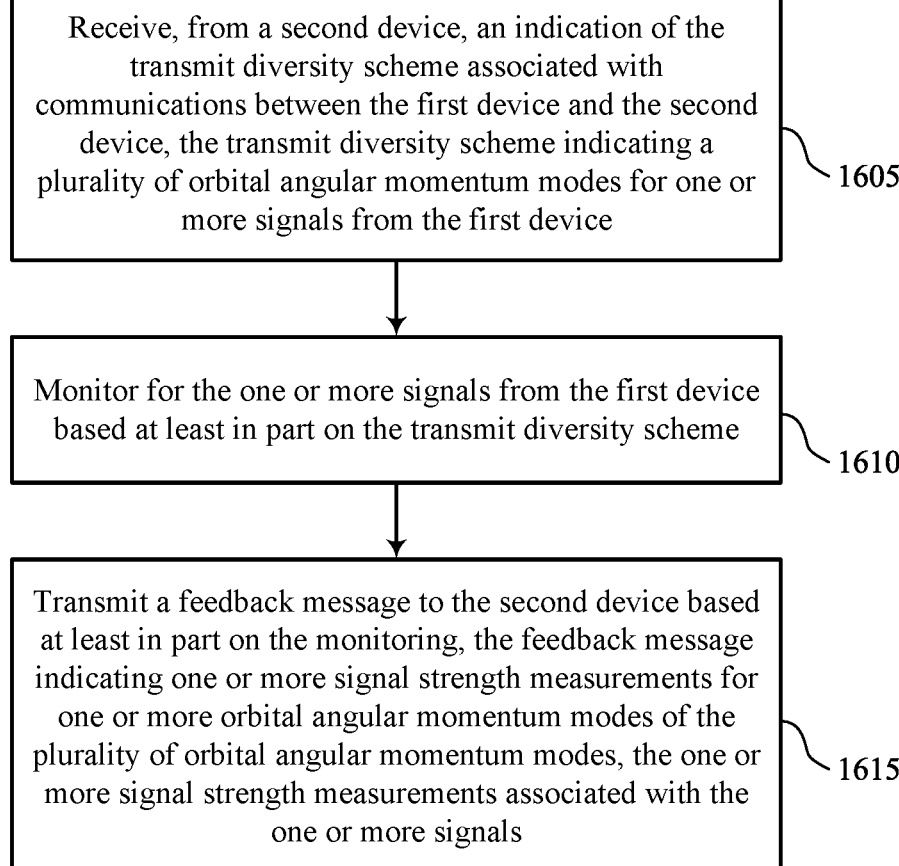

Receive, from a second device, an indication of the transmit diversity scheme associated with communications between the first device and the second device, the transmit diversity scheme indicating a plurality of orbital angular momentum modes for one or more signals from the first device

1605

Monitor for the one or more signals from the first device based at least in part on the transmit diversity scheme

1610

Transmit a feedback message to the second device based at least in part on the monitoring, the feedback message indicating one or more signal strength measurements for one or more orbital angular momentum modes of the plurality of orbital angular momentum modes, the one or more signal strength measurements associated with the one or more signals

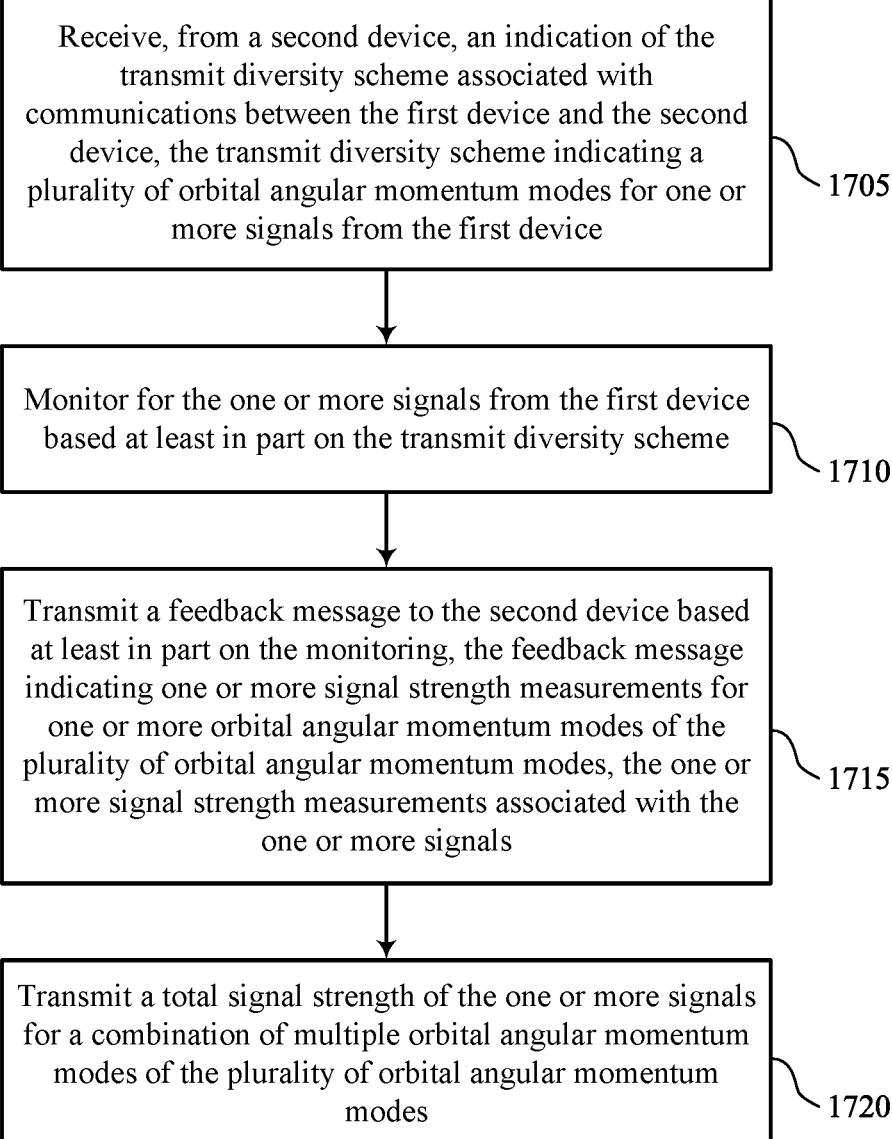

Receive, from a second device, an indication of the transmit diversity scheme associated with communications between the first device and the second device, the transmit diversity scheme indicating a plurality of orbital angular momentum modes for one or more signals from the first device

1705

Monitor for the one or more signals from the first device based at least in part on the transmit diversity scheme

1710

Transmit a feedback message to the second device based at least in part on the monitoring, the feedback message indicating one or more signal strength measurements for one or more orbital angular momentum modes of the plurality of orbital angular momentum modes, the one or more signal strength measurements associated with the one or more signals

1715

Transmit a total signal strength of the one or more signals for a combination of multiple orbital angular momentum modes of the plurality of orbital angular momentum modes

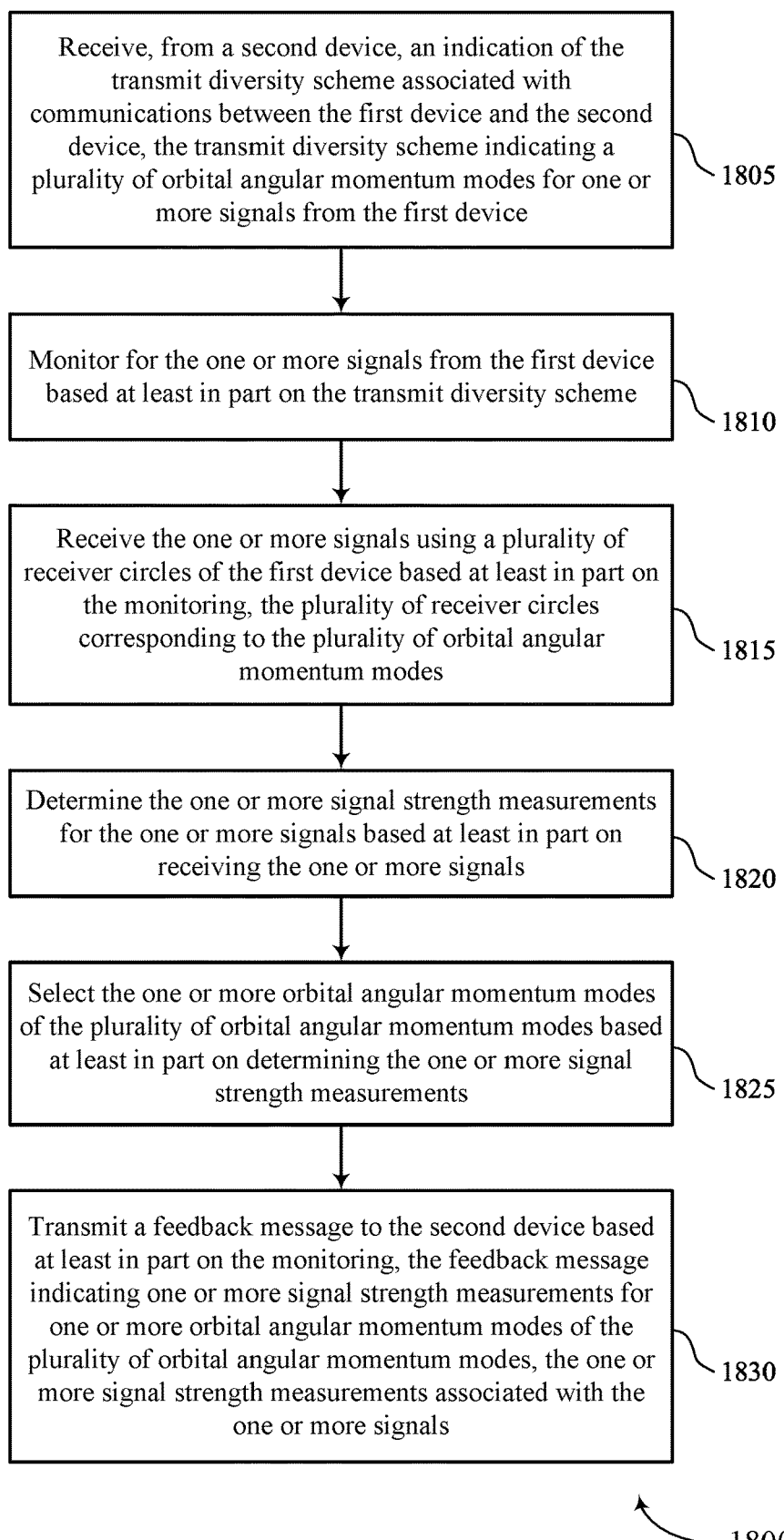

Receive, from a second device, an indication of the transmit diversity scheme associated with communications between the first device and the second device, the transmit diversity scheme indicating a plurality of orbital angular momentum modes for one or more signals from the first device — 1805

Monitor for the one or more signals from the first device based at least in part on the transmit diversity scheme — 1810

Receive the one or more signals using a plurality of receiver circles of the first device based at least in part on the monitoring, the plurality of receiver circles corresponding to the plurality of orbital angular momentum modes — 1815

Determine the one or more signal strength measurements for the one or more signals based at least in part on receiving the one or more signals — 1820

Select the one or more orbital angular momentum modes of the plurality of orbital angular momentum modes based at least in part on determining the one or more signal strength measurements — 1825

Transmit a feedback message to the second device based at least in part on the monitoring, the feedback message indicating one or more signal strength measurements for one or more orbital angular momentum modes of the plurality of orbital angular momentum modes, the one or more signal strength measurements associated with the one or more signals — 1830

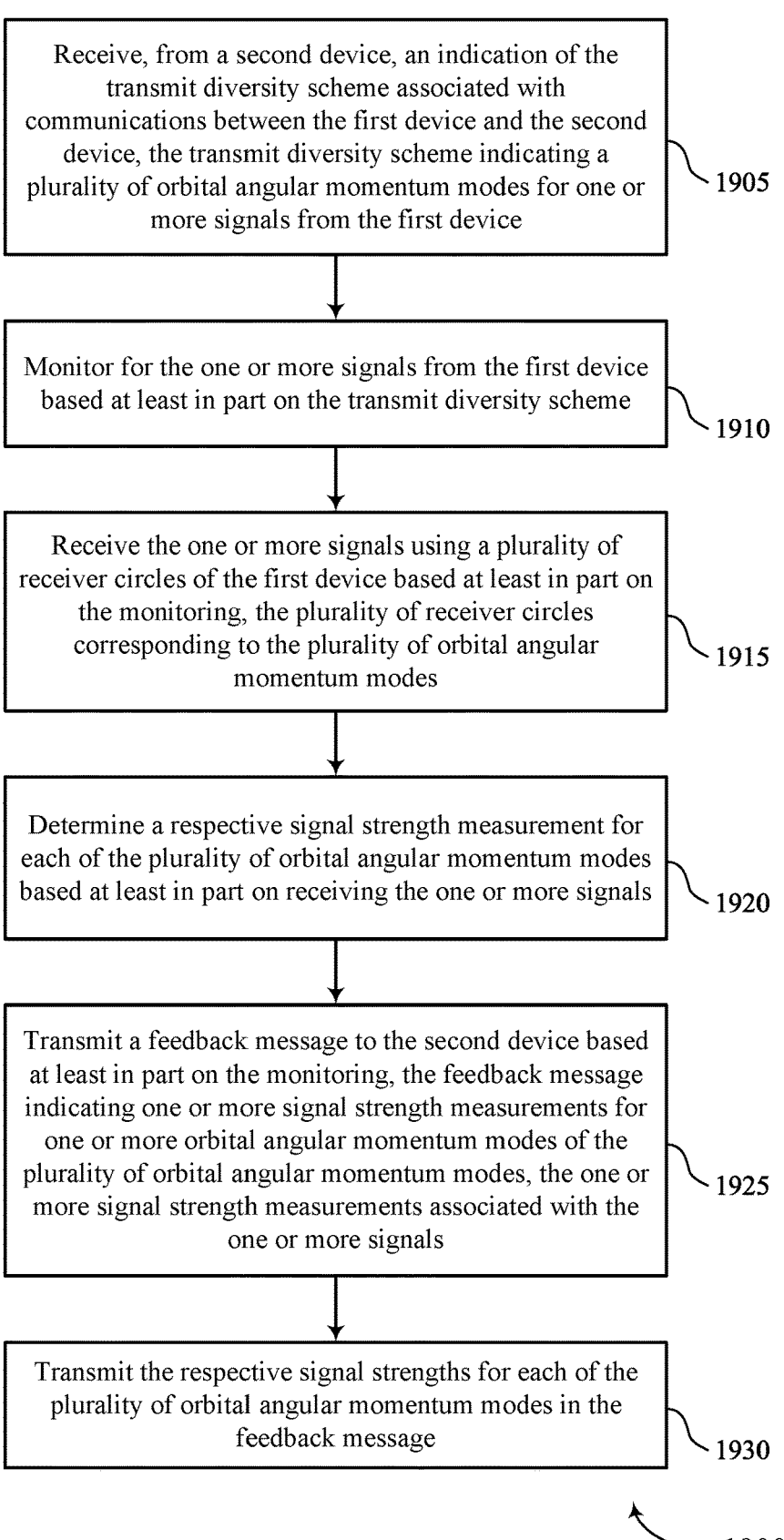

Receive, from a second device, an indication of the transmit diversity scheme associated with communications between the first device and the second device, the transmit diversity scheme indicating a plurality of orbital angular momentum modes for one or more signals from the first device — 1905

Monitor for the one or more signals from the first device based at least in part on the transmit diversity scheme — 1910

Receive the one or more signals using a plurality of receiver circles of the first device based at least in part on the monitoring, the plurality of receiver circles corresponding to the plurality of orbital angular momentum modes — 1915

Determine a respective signal strength measurement for each of the plurality of orbital angular momentum modes based at least in part on receiving the one or more signals — 1920

Transmit a feedback message to the second device based at least in part on the monitoring, the feedback message indicating one or more signal strength measurements for one or more orbital angular momentum modes of the plurality of orbital angular momentum modes, the one or more signal strength measurements associated with the one or more signals — 1925

Transmit the respective signal strengths for each of the plurality of orbital angular momentum modes in the feedback message — 1930

TRANSMIT DIVERSITY ACROSS ORBITAL ANGULAR MOMENTUM MODES

CROSS REFERENCE

The present Application is a 371 national stage filing of International PCT Application No. PCT/CN2021/105924 by ZHANG et al. entitled "TRANSMIT DIVERSITY ACROSS ORBITAL ANGULAR MOMENTUM MODES," filed Jul. 13, 2021, which is assigned to the assignee hereof, and which is expressly incorporated by reference in its entirety herein.

FIELD OF TECHNOLOGY

The following relates to wireless communications, including transmit diversity across orbital angular momentum modes.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). Efficient techniques for transmission of information in such systems is desirable in order to enhance system throughput and reliability.

SUMMARY

The described techniques relate to improved methods, systems, devices, and apparatuses that support orbital angular momentum (OAM) mode selection. Generally, the described techniques provide for enhanced OAM multiplexing procedures. In some implementations, a first device, such as a transmitting device, and a second device, such as a receiving device, may each be equipped with one or more antenna circles (e.g., uniform circular arrays (UCAs)). The one or more antenna circles may include a center antenna node, center antenna element, center circle, or center antenna array and one or more peripheral antenna circles that enable the first device and the second device to communicate according to one or more OAM modes using the one or more antenna circles. For example, the one or more antenna circles may enable the first and second devices to transmit and receive multiplexed OAM communications. Such multiplexed OAM communications may include multiple OAM waveforms with different OAM states, polarizations, or both.

In some aspects, a first device (e.g., a user equipment (UE), base station, integrated access and backhaul (IAB) node, relay node) or a second device (e.g., a UE, base station, IAB node, relay node), or both may determine a transmit diversity scheme for the first device to use for transmitting messages to the second device. For example, the first device, or the second device, or both may be configured to determine one or more OAM modes which may be used for transmissions by the first device (e.g., using one or more antenna circles (e.g., transmitter circles) of the transmitting device). In some cases, the first device may be configured to transmit signals to the second device using a combination of multiple OAM modes. For instance, the first device may transmit a single data stream or packet to the second device using multiple OAM modes. In such a case, the first device, the second device, or both may be configured to determine which OAM modes to use for transmission by the first device.

In some cases, a transmitting device may transmit one or more signals according to multiple OAM modes. A receiving device may receive the one or more signals and perform measurements on each of the received signals. In some cases, the receiving device may perform measurements on each of the received signals in accordance with control signaling received from the transmitting device. For example, the transmitting device may transmit control information to the receiving device, where the control information may include an indication that the transmitting device may use multiple OAM modes in subsequent transmissions, an indication of which OAM modes the transmitting device may use, an indication of which OAM modes the receiving device may use, or a combination thereof. In some cases, the receiving device may receive the control information and may perform measurements on the signals using a set of OAM modes (e.g., as indicated in the control information). The receiving device may transmit a measurement report indicating the signal measurements to the transmitting device where the transmitting device may receive the measurement report and may determine which OAM modes correspond to a relatively high received power, signal throughput, or the like. In some cases, the receiving device may perform measurements on the reference signals, select one or more OAM modes, and transmit a selection report indicating the selected OAM modes to the transmitting device. The transmitting device may receive the selection report and may transmit subsequent messages to the receiving device based thereon. In some cases, the receiving device may be configured to transmit measurement reports associated with individual OAM modes to the transmitting device. That is, the receiving device may receive signals, perform signal measurements using a set of OAM modes, and may transmit a respective measurement report for each OAM mode of the set of OAM modes. The transmitting device may receive the measurement report(s) and determine which OAM modes to use for subsequent communications. In any case, the first device may transmit a message, to the receiving device, indicating the determined OAM modes.

A method for wireless communications at a first device is described. The method may include selecting, from a set of multiple orbital angular momentum modes, a subset of orbital angular momentum modes for a transmit diversity scheme associated with communications between the first device and a second device, the subset including a first orbital angular momentum mode of the set of multiple orbital angular momentum modes and a second orbital angular momentum mode of the set of multiple orbital angular momentum modes, transmitting, to the second device, an indication of the transmit diversity scheme associated with communications between the first device and the second device, the transmit diversity scheme indicating the subset of orbital angular momentum modes, and transmitting, based on the transmit diversity scheme, a data packet to the second device using a set of transmitter circles of the first device, the set of transmitter circles corresponding to both the first orbital angular momentum mode and the second orbital angular momentum mode.

An apparatus for wireless communications at a first device is described. The apparatus may include a processor, memory coupled with the processor, and instructions stored in the memory. The instructions may be executable by the processor to cause the apparatus to select, from a set of multiple orbital angular momentum modes, a subset of orbital angular momentum modes for a transmit diversity scheme associated with communications between the first device and a second device, the subset including a first orbital angular momentum mode of the set of multiple orbital angular momentum modes and a second orbital angular momentum mode of the set of multiple orbital angular momentum modes, transmit, to the second device, an indication of the transmit diversity scheme associated with communications between the first device and the second device, the transmit diversity scheme indicating the subset of orbital angular momentum modes, and transmit, based on the transmit diversity scheme, a data packet to the second device using a set of transmitter circles of the first device, the set of transmitter circles corresponding to both the first orbital angular momentum mode and the second orbital angular momentum mode.

Another apparatus for wireless communications at a first device is described. The apparatus may include means for selecting, from a set of multiple orbital angular momentum modes, a subset of orbital angular momentum modes for a transmit diversity scheme associated with communications between the first device and a second device, the subset including a first orbital angular momentum mode of the set of multiple orbital angular momentum modes and a second orbital angular momentum mode of the set of multiple orbital angular momentum modes, means for transmitting, to the second device, an indication of the transmit diversity scheme associated with communications between the first device and the second device, the transmit diversity scheme indicating the subset of orbital angular momentum modes, and means for transmitting, based on the transmit diversity scheme, a data packet to the second device using a set of transmitter circles of the first device, the set of transmitter circles corresponding to both the first orbital angular momentum mode and the second orbital angular momentum mode.

A non-transitory computer-readable medium storing code for wireless communications at a first device is described. The code may include instructions executable by a processor to select, from a set of multiple orbital angular momentum modes, a subset of orbital angular momentum modes for a transmit diversity scheme associated with communications between the first device and a second device, the subset including a first orbital angular momentum mode of the set of multiple orbital angular momentum modes and a second orbital angular momentum mode of the set of multiple orbital angular momentum modes, transmit, to the second device, an indication of the transmit diversity scheme associated with communications between the first device and the second device, the transmit diversity scheme indicating the subset of orbital angular momentum modes, and transmit, based on the transmit diversity scheme, a data packet to the second device using a set of transmitter circles of the first device, the set of transmitter circles corresponding to both the first orbital angular momentum mode and the second orbital angular momentum mode.

Some examples of the method, apparatuses, and non-transitory computer-readable medium described herein may further include operations, features, means, or instructions for receiving, from the second device, a feedback message for the data packet, the feedback message indicating a signal strength of the data packet and one or more orbital angular momentum modes for the transmit diversity scheme.

Some examples of the method, apparatuses, and non-transitory computer-readable medium described herein may further include operations, features, means, or instructions for transmitting a control message corresponding to the data packet, the control message instructing the second device to provide feedback for the data packet based on the first orbital angular momentum mode and the second orbital angular momentum mode.

Some examples of the method, apparatuses, and non-transitory computer-readable medium described herein may further include operations, features, means, or instructions for receiving, from the second device, a feedback message for the data packet, the feedback message indicating a signal strength of the data packet for a combination of the first orbital angular momentum mode and the second orbital angular momentum mode.

Some examples of the method, apparatuses, and non-transitory computer-readable medium described herein may further include operations, features, means, or instructions for transmitting a control message corresponding to the data packet, the control message indicating the transmit diversity scheme for transmission of the data packet.

Some examples of the method, apparatuses, and non-transitory computer-readable medium described herein may further include operations, features, means, or instructions for transmitting one or more signals using a set of multiple transmitter circles of the first device, the set of multiple transmitter circles corresponding to the set of multiple orbital angular momentum modes and receiving, from the second device, a feedback message for the one or more signals, the feedback message indicating a combination of one or more orbital angular momentum modes of the set of multiple orbital angular momentum modes and a signal strength corresponding to the combination of the one or more orbital angular momentum modes.

In some examples of the method, apparatuses, and non-transitory computer-readable medium described herein, selecting the subset of orbital angular momentum modes may include operations, features, means, or instructions for selecting the subset of orbital angular momentum modes based on the feedback message, where the subset includes the combination of the one or more orbital angular momentum modes.

In some examples of the method, apparatuses, and non-transitory computer-readable medium described herein, the feedback message indicates which of the set of multiple orbital angular momentum modes may be combined by the second device.

Some examples of the method, apparatuses, and non-transitory computer-readable medium described herein may further include operations, features, means, or instructions for transmitting one or more signals using a set of multiple transmitter circles of the first device, the set of multiple transmitter circles corresponding to the set of multiple orbital angular momentum modes and receiving, from the second device, a feedback message for the one or more signals, the feedback message indicating a respective signal strength for each of the set of multiple orbital angular momentum modes.

In some examples of the method, apparatuses, and non-transitory computer-readable medium described herein, selecting the subset of orbital angular momentum modes may include operations, features, means, or instructions for selecting the subset of orbital angular momentum modes based on the respective signal strengths for each of the set of multiple orbital angular momentum modes.

A method for wireless communications at a first device is described. The method may include receiving, from a second device, an indication of the transmit diversity scheme associated with communications between the first device and the second device, the transmit diversity scheme indicating a set of multiple orbital angular momentum modes for one or more signals from the first device, monitoring for the one or more signals from the first device based on the transmit diversity scheme, and transmitting a feedback message to the second device based on the monitoring, the feedback message indicating one or more signal strength measurements for one or more orbital angular momentum modes of the set of multiple orbital angular momentum modes, the one or more signal strength measurements associated with the one or more signals.

An apparatus for wireless communications at a first device is described. The apparatus may include a processor, memory coupled with the processor, and instructions stored in the memory. The instructions may be executable by the processor to cause the apparatus to receive, from a second device, an indication of the transmit diversity scheme associated with communications between the first device and the second device, the transmit diversity scheme indicating a set of multiple orbital angular momentum modes for one or more signals from the first device, monitor for the one or more signals from the first device based on the transmit diversity scheme, and transmit a feedback message to the second device based on the monitoring, the feedback message indicating one or more signal strength measurements for one or more orbital angular momentum modes of the set of multiple orbital angular momentum modes, the one or more signal strength measurements associated with the one or more signals.

Another apparatus for wireless communications at a first device is described. The apparatus may include means for receiving, from a second device, an indication of the transmit diversity scheme associated with communications between the first device and the second device, the transmit diversity scheme indicating a set of multiple orbital angular momentum modes for one or more signals from the first device, means for monitoring for the one or more signals from the first device based on the transmit diversity scheme, and means for transmitting a feedback message to the second device based on the monitoring, the feedback message indicating one or more signal strength measurements for one or more orbital angular momentum modes of the set of multiple orbital angular momentum modes, the one or more signal strength measurements associated with the one or more signals.

A non-transitory computer-readable medium storing code for wireless communications at a first device is described. The code may include instructions executable by a processor to receive, from a second device, an indication of the transmit diversity scheme associated with communications between the first device and the second device, the transmit diversity scheme indicating a set of multiple orbital angular momentum modes for one or more signals from the first device, monitor for the one or more signals from the first device based on the transmit diversity scheme, and transmit a feedback message to the second device based on the monitoring, the feedback message indicating one or more signal strength measurements for one or more orbital angular momentum modes of the set of multiple orbital angular momentum modes, the one or more signal strength measurements associated with the one or more signals.

In some examples of the method, apparatuses, and non-transitory computer-readable medium described herein, transmitting the feedback message may include operations, features, means, or instructions for transmitting a total signal strength of the one or more signals for a combination of multiple orbital angular momentum modes of the set of multiple orbital angular momentum modes.

Some examples of the method, apparatuses, and non-transitory computer-readable medium described herein may further include operations, features, means, or instructions for receiving a control message for a data packet, the control message instructing the second device to provide feedback for the data packet based on a combination of a first orbital angular momentum mode and a second orbital angular momentum mode of the set of multiple orbital angular momentum modes, where the one or more signal strength measurements for the one or more orbital angular momentum modes correspond to the combination of the first orbital angular momentum mode and the second orbital angular momentum mode.

In some examples of the method, apparatuses, and non-transitory computer-readable medium described herein, the control message includes the indication of the transmit diversity scheme.

Some examples of the method, apparatuses, and non-transitory computer-readable medium described herein may further include operations, features, means, or instructions for receiving a control message for a data packet, the control message including the indication of the transmit diversity scheme.

Some examples of the method, apparatuses, and non-transitory computer-readable medium described herein may further include operations, features, means, or instructions for receiving the one or more signals using a set of multiple receiver circles of the first device based on the monitoring, the set of multiple receiver circles corresponding to the set of multiple orbital angular momentum modes, determining the one or more signal strength measurements for the one or more signals based on receiving the one or more signals, and selecting the one or more orbital angular momentum modes of the set of multiple orbital angular momentum modes based on determining the one or more signal strength measurements.

In some examples of the method, apparatuses, and non-transitory computer-readable medium described herein, transmitting the feedback message may include operations, features, means, or instructions for transmitting a total signal strength for the selected one or more orbital angular momentum modes in the feedback message.

Some examples of the method, apparatuses, and non-transitory computer-readable medium described herein may further include operations, features, means, or instructions for receiving the one or more signals using a set of multiple receiver circles of the first device based on the monitoring, the set of multiple receiver circles corresponding to the set of multiple orbital angular momentum modes, determining a respective signal strength measurement for each of the set of multiple orbital angular momentum modes based on receiving the one or more signals, and transmitting the respective signal strengths for each of the set of multiple orbital angular momentum modes in the feedback message.

BRIEF DESCRIPTION OF THE DRAWINGS

FIG. 6 illustrates an example of a process flow that supports transmit diversity across orbital angular momentum modes in accordance with aspects of the present disclosure.

FIGS. 12 through 19 show flowcharts illustrating methods that support transmit diversity across orbital angular momentum modes in accordance with aspects of the present disclosure.

DETAILED DESCRIPTION

Figure 1:
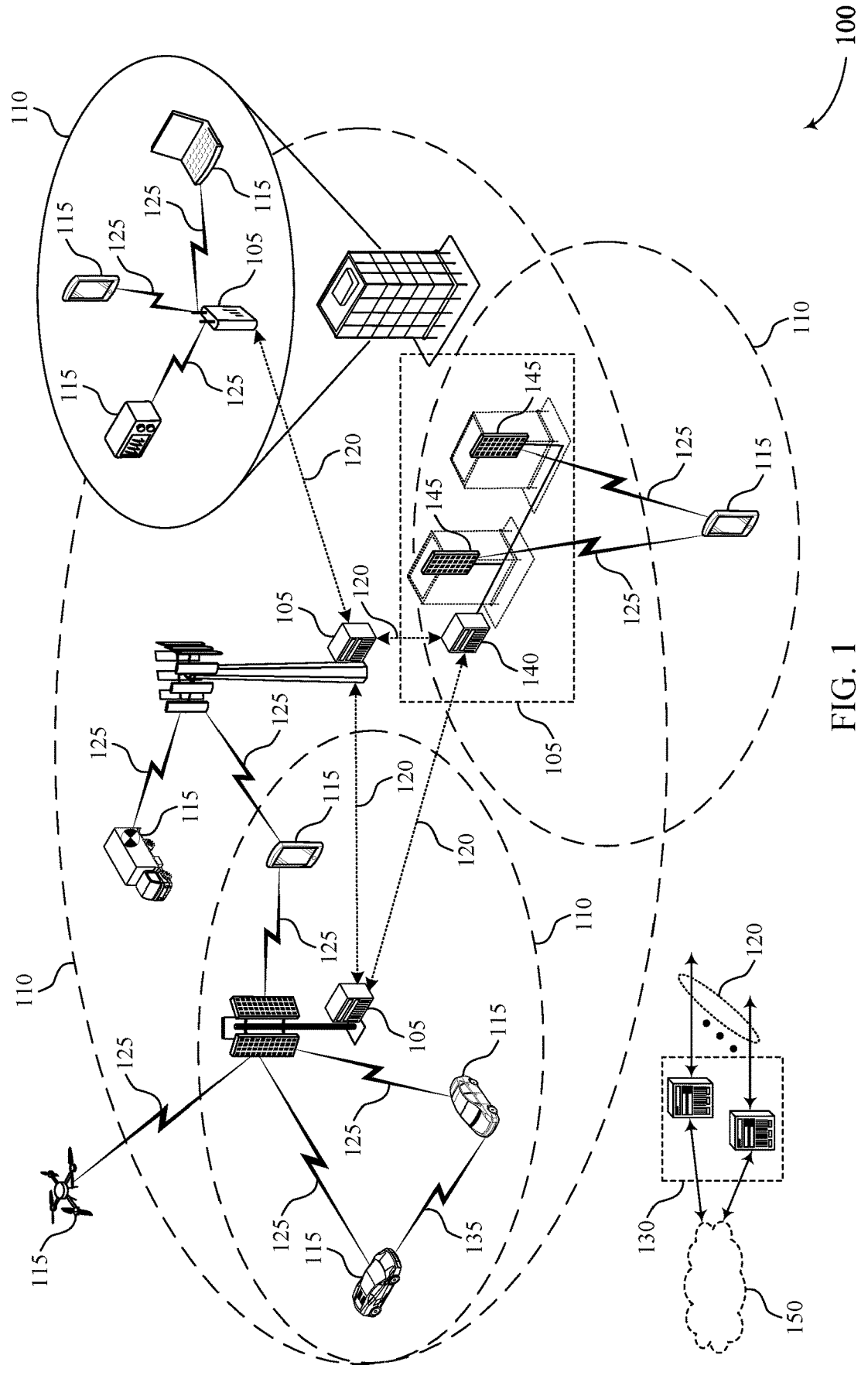
FIG. 1 illustrates an example of a wireless communications system that supports transmit diversity across orbital angular momentum modes in accordance with aspects of the present disclosure.

In some wireless communications systems, wireless devices, such as base stations or user equipments (UEs), or both, may communicate directionally, for example, using beams to orient communication signals over one or more directions. In some systems, such as in orbital angular momentum (OAM)-capable communications systems, the wireless devices may communicate using OAM beams, which, in addition to providing signal directionality, may also provide additional dimensions for signal multiplexing. In some aspects, for example, such additional dimensions may include an OAM state, a polarization, or both, where OAM beams with different OAM states, polarizations, or both may be orthogonal to each other. As such, OAM beams with different OAM states or polarizations may be multiplexed together to increase the capacity of an OAM link. In some cases, a wireless device may use spiral phase plate (SPP) or uniform circular array (UCA)-based methodologies to generate OAM beams.

In some cases, a transmitting device and a receiving device may each be equipped with one or more antenna circles (e.g., UCAs). The one or more antenna circles may include a center antenna circle and one or more peripheral antenna circles that enable the transmitting device and the receiving device to communicate according to one or more OAM modes. In an OAM-based communication system in which a transmitting device, or a receiving device, or both are each configured to communicate using multiple OAM modes, the efficiency of OAM transmissions may be different for each OAM mode. For example, a signal produced by a first antenna circle according to a first OAM mode may have a different channel gain than a signal produced by the first antenna circle (or a different antenna circle) according to a second OAM mode. To increase efficiency and throughput in the OAM-communications system, devices may be configured to use a combination of OAM modes when transmitting signals. In some examples, a transmitting device (e.g., a UE, base station, integrated access and backhaul (IAB) node, relay node) or a receiving device (e.g., a UE, base station, IAB node, relay node), or both may determine a transmission scheme for the transmitting device to use for transmitting signals (e.g., a data stream, reference signals) to the receiving device. For example, the transmitting device, or the receiving deice, or both may be configured to determine which OAM modes (or combination of OAM modes) the transmitting device may use for OAM communications to increase data throughput.

In some cases, the transmitting device may transmit one or more signals (e.g., in a data stream, as reference signals, or the like) according to multiple OAM modes. For example, the transmitting device may transmit one or more signals using a combination of two or more OAM modes. The receiving device may receive the one or more signals and perform measurements (e.g., channel gain, reference signal received power (RSRP), signal to noise ratio (SNR), reference signal received quality (RSRQ)) on each received signal. In some cases, the receiving device may perform measurements on each of the received signals in accordance with control signaling received from the transmitting device. For example, the transmitting device may transmit control information to the receiving device, where the control information may include an indication that the transmitting device may use multiple OAM modes when transmitting signals, an indication of which OAM modes the transmitting device may use, an indication of which OAM modes the receiving device may use, or a combination thereof. In some cases, the receiving device may receive the control information and may perform measurements on the signals using a set of OAM modes as indicated in the control information, a set of OAM modes determined by the receiving device, or both. In some examples, the receiving device may perform measurements on the signals using individual OAM modes, a selective combination of individual OAM modes, a coherent combination of OAM modes (e.g., using all OAM modes of a set of OAM modes), or a combination thereof. The receiving device may transmit a measurement report indicating the signal measurements to the transmitting device where the transmitting device may receive the measurement report and may determine which OAM modes correspond to a relatively high received power, signal throughput, or the like. As such, the transmitting device may transmit an indication of which OAM modes may be used for subsequent transmissions, to the receiving device.

In some cases, the receiving device may be configured to select one or more OAM modes and transmit a selection report indicated the selected OAM modes to the transmitting device. That is, the receiving device may perform measurements on received signals, select one or more (preferred) OAM modes (e.g., OAM modes associated with relatively high RSRP, SNR, RSRQ, channel gain, and the like), and transmit the selection report to the transmitting device. The transmitting device may receive the selection report and may transmit subsequent signals to the receiving device based thereon. For example, the transmitting device may determine to use the OAM modes indicated in the selection report. In another example, the transmitting device may determine to use a different set of OAM modes (e.g., based on transmitting device channel estimation or any other means of autonomous determination).

In some cases, the receiving device may be configured to transmit measurement reports associated with individual OAM modes to the transmitting device. That is, the receiving device may receive signals, perform signal measurements using a set of OAM modes, and may transmit a measurement report for each OAM mode of the set of OAM modes. For example, the receiving device may measure the signals using three OAM modes. The receiving device may transmit, to the transmitting device, a first measurement report indicating a signal power for a first OAM mode, a second measurement report indicating a signal power for a second OAM mode, and a third measurement report indicating a signal power for a third OAM mode. The transmitting device may receive the measurement report(s), determine which OAM modes to use for subsequent communications, and may transmit a message, to the receiving device, indicating the determined OAM modes.

Particular aspects of the subject matter described herein may be implemented to realize one or more advantages. The described techniques may be implemented to realize enhanced communications between devices (e.g., wireless devices) via OAM beams. For example, based on implementing the described OAM mode selection techniques, devices may communicate according to multiple OAM modes based on the channel gain of specific OAM mode combinations. As such, the OAM mode selection techniques as described herein may support improved throughput (e.g., data throughput) in OAM-based communications systems. Further, based on a greater ability to transfer information using OAM-based communications, the wireless devices may experience increased reliability and a greater likelihood of successful communications. As such, supported techniques may include improved network operations and, in some examples, may promote network efficiencies, among other benefits.

Aspects of the disclosure are initially described in the context of wireless communications systems. Aspects are the described with respect to an OAM configuration, a UCA OAM configuration, a multi-circle UCA-based OAM configuration, and a process flow. Aspects of the disclosure are further illustrated by and described with reference to apparatus diagrams, system diagrams, and flowcharts that relate to transmit diversity across OAM modes.

FIG. 1 illustrates an example of a wireless communications system 100 that supports transmit diversity across OAM modes in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a transmitting device (e.g., a UE 115, a base station 105, or the like) and a receiving device (e.g., a UE 115, a base station 105, or the like) may each be equipped with one or more antenna circles (e.g., UCAs). The one or more antenna circles may include a center antenna circle and one or more peripheral antenna circles that enable the transmitting device and the receiving device to communicate according to one or more OAM modes. In an OAM-based communication system in which a transmitting device, or a receiving device, or both are each configured to communicate using multiple OAM modes, the efficiency of OAM transmissions may be different for each OAM mode. In some examples, the transmitting device or the receiving device or both may determine a transmission scheme for the transmitting device to use for transmitting signals (e.g., a data stream, reference signals) to the receiving device.

In some cases, the transmitting device may transmit one or more signals (e.g., in a data stream, as reference signals, or the like) according to multiple OAM modes. For example, the transmitting device may transmit one or more signals using a combination of two or more OAM modes. The receiving device may receive the one or more signals and perform measurements (e.g., channel gain, RSRP, SNR, RSRQ) on each received signal. The receiving device may transmit a measurement report indicating the signal measurements to the transmitting device where the transmitting device may receive the measurement report and may determine which OAM modes correspond to a relatively high received power, signal throughput, or the like. As such, the transmitting device may transmit an indication of which OAM modes may be used for subsequent transmissions, to the receiving device.

Figure 2:
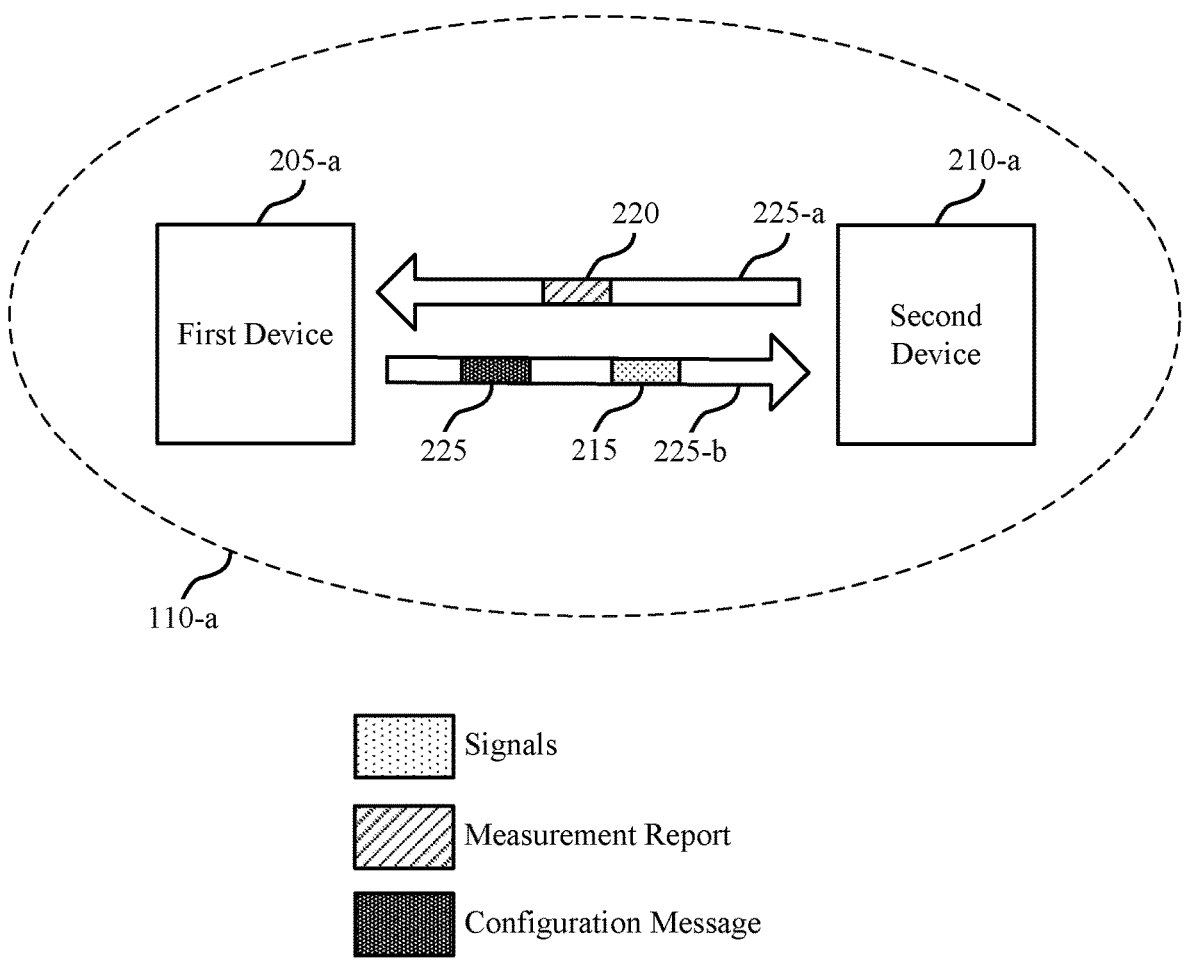
FIG. 2 illustrates an example of a wireless communications system that supports transmit diversity across orbital angular momentum modes in accordance with aspects of the present disclosure.

FIG. 2 illustrates an example of a wireless communications system 200 that supports transmit diversity across OAM modes in accordance with aspects of the present disclosure. In some examples, wireless communications system 200 may implement aspects of wireless communications system 100. The wireless communications system 200 may illustrate communications between a first device 205-*a* and a second device 210-*a*, where the first device 205-*a* and the second device 210-*a* may be the same device or may be different devices. The first device 205-*a* and the second device 210-*a* may each be a UE, a base station, or an IAB node, among other devices. The first device 205-*a* and the second device 210-*a* may be examples of corresponding devices described herein. In some cases, the first device 205-*a*, or the second device 210-*a* may serve a geographic coverage area 110-*a*. In some examples, the wireless communications system 200 (which may be an example of a sixth generation (6G) system, a fifth generation (5G) system, or another generation system) may support OAM-based communications and, as such, the first device 205-*a* and the second device 210-*a* may transmit or receive OAM beams, or OAM-related signals over communication links 225 within the geographic coverage area 110-*a*.

In some examples, the first device 205-*a* or the second device 210-*a* may support OAM-based communication by using OAM of electromagnetic waves to distinguish between different signals. The OAM of electromagnetic waves may be different than spin angular momentum (SAM) of electromagnetic waves, and both may contribute to the overall angular momentum of an electromagnetic wave as defined in quantum mechanics by Equation 1, shown below.

$$J = \int\int\int r \times S \, dxdydz = \Sigma + L \quad (1)$$

As shown in Equation 1, J is equal to the angular momentum of the electromagnetic wave, r is a position vector, S=E×H and is equal to the Poynting flux, where E is equal to the electric field vector and H is equal to the magnetic field's auxiliary field vector, E is equal to the SAM of the electromagnetic wave (and is sometimes alternatively denoted as S), and L is equal to the OAM of the electromagnetic wave. In some cases, the SAM of the electromagnetic wave may be associated with a polarization of the electromagnetic wave. For example, the electromagnetic wave may be associated with different polarizations (e.g., circular polarizations), such as left and right. Accordingly, the SAM of the electromagnetic wave may have multiple (e.g., two) degrees of freedom.

Further, the electromagnetic wave may have two polarizations, either two linear polarizations (e.g., one horizontal and one vertical) or circular and elliptical polarizations (e.g., clockwise and counter-clockwise). Polarization corresponds to SAM as opposed to OAM, and as such, SAM and OAM may be two independent properties of an electromagnetic wave. The techniques described herein, which support both OAM and polarizations, may increase (e.g., double) the number of streams capable of being multiplexed using MIMO.

OAM-based electromagnetic waveforms may be variants of Gaussian beams, as described by the Laguerre-Gaussian modes and waveforms shown below in Equation 2.

$$u_{l,p} = \sqrt{\frac{2p!}{\pi(p+|l|)!}} \frac{1}{w(z)} \left(\frac{p\sqrt{2}}{w(z)}\right)^{|l|} \exp\left(\frac{-p^2}{w^2(z)}\right) L_p^{|l|}\left(\frac{2p^2}{w^2(z)}\right) e^{il\phi} \times \quad (2)$$
$$\exp\left(-ik\frac{p^2 z}{2(z_R^2 + z^2)}\right) \exp\left[-i(2p+|l|+1)\tan^{-1}\left(\frac{z}{z_R}\right)\right]$$

The Laguerre-Gaussian modes shown in Equation 2 may include cylindrical polar coordinates (e.g., $\rho$, $\varphi$, and z), where $$L_p^{|l|}$$

is an associated Laguerre polynomial, $z_R$ is a Rayleigh range (e.g., a measure of the tightness of the focus) equivalent to the term $$\frac{kw^2(0)}{2}, \text{ and } w(z) = w(0)\sqrt{1 + \frac{z^2}{z_R^2}}$$

is the beam width. In addition, the azimuth phase term (e.g., $e^{il\phi}$) may provide a link to OAM based on electromagnetic wave theory and quantum mechanics. In some cases, a situation may arise for a transmitter based on a specific criterion (e.g., z=0). In such cases, the Laguerre-Gaussian modes may be represented by a different equation, shown below in Equation 3.

$$u_{l,p} \propto p^{|l|}\exp(-p^2)L_p^{|l|}\left(\frac{2p^2}{w^2(0)}\right)e^{il\varphi} \quad (3)$$

The OAM waveforms, which may also be referred to as Hermite Gaussian waveforms or Laguerre-Gaussian waveforms, may form a set of complete and orthonormal basis, such that a channel between a transmitter and a receiver may correspond to multiple independent parallel channels, each of which may correspond to a respective OAM waveform indexed by (l,p). In some examples, OAM waveforms may be derived from a combination of Sturm-Liouville theory (in which the polar OAM waveform is assumed to be separable) and a polynomial expansion (e.g., using one or more Bessel functions). OAM waveform derivations may also be derived from information theoretic consequence. According to the information theoretic consequence, a capacity of the channel may be analyzed based on each OAM waveform. In such cases, an optimal transmission scheme may be based on water-filling among the OAM waveforms. Using OAM waveforms as the set of complete and orthonormal basis may align with criteria of an information theoretic analysis.

The derivation of OAM waveforms may be based on using Maxwell equations as vector equations in free space without any free change, which may be solved by a scalar form, namely the Helmholtz equation, shown below in Equation 4.

$$\nabla^2 v + k^2 v = 0 \tag{4}$$

Assuming a paraxial wave (e.g., $v=ue^{ikz}$) and assuming the variation of amplitude (e.g., u) in the z direction is slow, a term $$\left(\text{e.g., } \frac{\partial^2}{\partial z^2} u\right)$$

may be dropped from the Helmholtz equation shown above in Equation 4. As a result, the Helmholtz equation may become a different equation, shown below in Equation 5.

$$i\frac{\partial}{\partial z} u = -\frac{1}{2k}\left(\frac{\partial^2}{\partial x^2} + \frac{\partial^2}{\partial y^2}\right)u \tag{5}$$

The partial differential equation shown in Equation 5 may be solved using two approaches, namely a differential solution and an integral solution. More specifically, the integral solution may include the Green function and the Huygens-Fresnel Principle.

Based on the theory of the Green function, which describes a waveform from a single point source with the same boundary condition, the Helmholtz equation shown in Equation 4 may be solved in an integral form, which is the equivalent to the Huygens-Fresnel principle. A signal at a receiver plane v may be written as a function of a transmitter signal u, as shown below in Equation 6.

$$v = \int\int u\frac{\exp(jkr)}{r}\Psi dS \tag{6}$$

In Equation 6, $\Psi$ may be equivalent to $\cos\theta$ or some other function of the angle of propagation close to $\cos\theta$. In some cases, $\Psi$ may be close to 1 (e.g., $\Psi\approx1$). In some cases, eigen modes may be identified by performing a singular value decomposition (SVD) on a transfer matrix, where a Gaussian term may be present in the eigenvectors.

In some cases, the OAM of the electromagnetic wave may be associated with a field spatial distribution of the electromagnetic wave, which may be in the form of a helical or twisted wavefront shape (e.g., in examples in which a light beam can be associated with a helical or twisted wavefront). For example, an electromagnetic wave (e.g., a light beam) may be in a helical mode (which may also be referred to as an OAM mode) and such helical modes may be characterized by a wavefront that is shaped as a helix with an optical vortex in the center (e.g., at the beam axis), where each helical mode is associated with a different helical wavefront structure. The helical modes (e.g., OAM modes, which may also be referred to as OAM states) may be defined or referred to by a mode index l, where a sign of the mode index (corresponds to a "handedness" (e.g., left or right) of the helix (or helices) and a magnitude of the mode index l (e.g., |l|) corresponds to a quantity of distinct but interleaved helices of the electromagnetic wave.

For example, for an electromagnetic wave associated with an OAM mode index of l=0, the electromagnetic wave is not helical and the wavefronts of the electromagnetic wave are multiple disconnected surfaces (e.g., the electromagnetic wave is a sequence of parallel planes). For an electromagnetic wave associated with an OAM mode index of l=+1, the electromagnetic wave may propagate in a right-handed pattern (e.g., has a right circular polarization or may be understood as having a clockwise circular polarization) and the wavefront of the electromagnetic wave may be shaped as a single helical surface with a step length equal to a wavelength A of the electromagnetic wave. Likewise, the phase delay over one revolution of the electromagnetic wave may be equal to 2x. Similarly, for an OAM mode index of l=−1, the electromagnetic wave may propagate in a left-handed pattern (e.g., has a left circular polarization or may be understood as having a counter-clockwise circular polarization) and the wavefront of the electromagnetic wave may be also be shaped as a single helical surface with a step length equal to the wavelength 1 of the electromagnetic wave. Likewise, the phase delay over one revolution of the electromagnetic wave may be equal to −2π.

For further example, for an OAM mode index of l=±2, the electromagnetic wave may propagate in either a right-handed pattern (if +2) or in a left-handed pattern (if −2) and the wavefront of the electromagnetic wave may include two distinct but interleaved helical surfaces. In such examples, the step length of each helical surface may be equal to $\mu/2$. Likewise, the phase delay over one revolution of the electromagnetic wave may be equal to $\pm4\pi$. In general terms, a mode-l electromagnetic wave may propagate in either a right-handed pattern or a left-handed pattern (depending on the sign of l) and may include l distinct but interleaved helical surfaces with a step length of each helical surface equal to $\lambda/|l|$. Likewise, the phase delay over one revolution of the electromagnetic wave may be equal to $2l\pi$. In some examples, an electromagnetic wave may be indefinitely extended to provide for an infinite number of degrees of freedom of the OAM of the electromagnetic wave (e.g., l=0, $\pm1, \pm2, \ldots, \pm\infty$). As such, the OAM of the electromagnetic wave (e.g., L as defined in Equation 1) may be associated with infinite degrees of freedom.

In some examples, the OAM mode index l of an electromagnetic wave may correspond to or otherwise function as (e.g., be defined as) an additional dimension for signal or channel multiplexing. For example, each OAM mode, which may correspond to an OAM state (of which there may be infinite), may function similarly (e.g., or equivalently) to a communication channel, such as a sub-channel. In other words, an OAM mode or state may correspond to a communication channel, and vice versa. For instance, the first device 205-a or the second device 210-a may communicate separate signals using electromagnetic waves having different OAM modes or states similarly to how the first device 205-a or the second device 210-a may transmit separate signals over different communication channels. In some aspects, such use of the OAM modes or states of an electromagnetic wave to carry different signals may be referred to as the use of OAM beams.

Additionally, in some examples, electromagnetic waves with different OAM modes (e.g., OAM states) may be mutually orthogonal to each other (e.g., in a Hilbert space, in which a space may include an infinite set of axes and sequences may become infinite by way of always having another coordinate direction in which next elements of the sequence can go). Likewise, in a Hilbert space, orthogonal OAM modes or states may correspond to orthogonal communication channels (e.g., orthogonal sequences transmitted over a communication channel) and, based on the potentially infinite number of OAM modes or states, the wireless communications system 200 employing the use of OAM beams may theoretically achieve infinite capacity. For example, in theory, an infinite number of OAM states or modes may be twisted together for multiplexing and the capacity of the OAM link can approach infinity while preserving orthogonality between signals carried by different OAM modes (e.g., indices). In practice, however, due to non-ideal factors (e.g., Tx/Rx axial or position placement error, propagation divergence, and the like), crosstalk among OAM modes at the receiver may result, and thus a reduced number of concurrent OAM modes may be implemented between wireless devices (e.g., two or four concurrent OAM modes). In some cases, the first device 205-*a* or the second device 210-*a* may generate such OAM beams using SPP or UCA methodologies, as described with reference to FIGS. 3 and 4.

Figure 4:
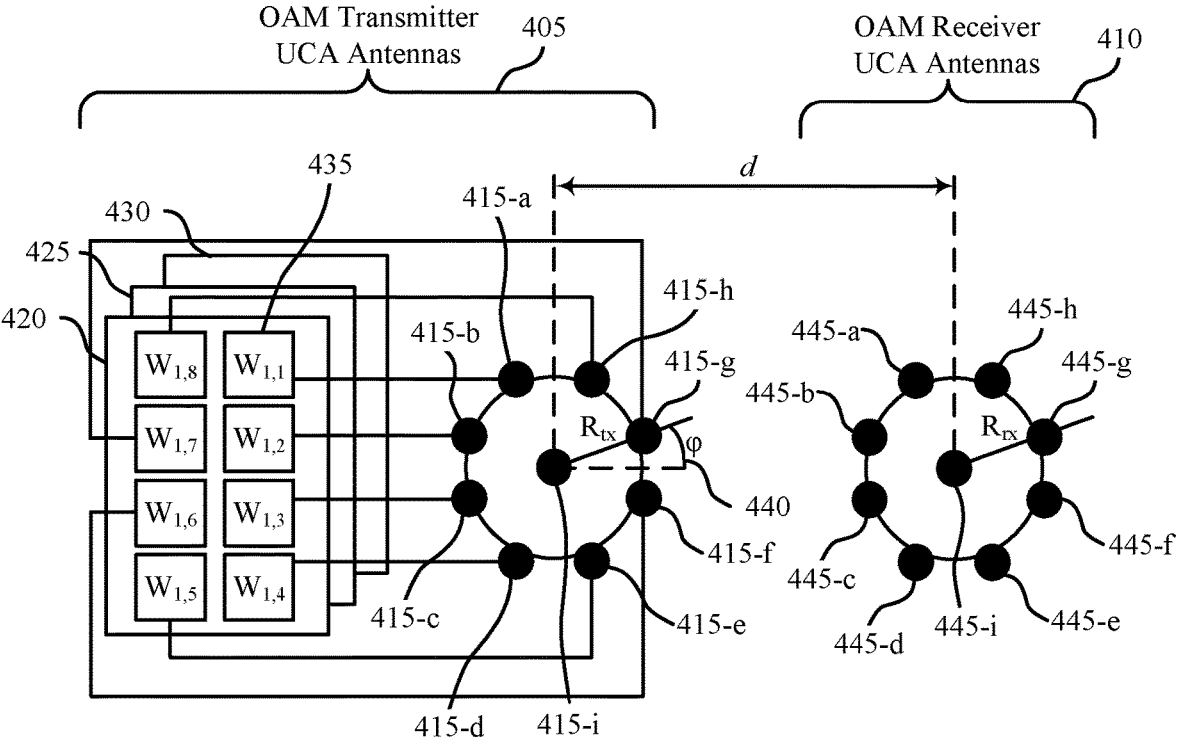
FIG. 4 illustrates an example of a uniform circular antenna (UCA) OAM configuration that supports transmit diversity across orbital angular momentum modes in accordance with aspects of the present disclosure.

In some aspects, as described with respect to FIG. 4, the first device 205-*a*, or the second device 210-*a*, or both may be configured with a set of antennas configured in a circle, such as a UCA antenna circle (e.g., antenna circle, transmitter circle). In some cases, the first device 205-*a* and the second device 210-*a* may each be equipped with one or more UCA circles that the first device 205-*a* and the second device 210-*a* may use to communicate according to one or more OAM modes. In scenarios in which the first device 205-*a*, or the second device 210-*a*, or both each are equipped to communicate using multiple OAM modes or multiple UCA circles, the efficiency of each UCA circle or OAM mode (e.g., a channel gain, an RSRP, an RSRQ, an SNR, or the like of signals from each UCA circle) may be different for each OAM mode. For example, a signal produced by a first antenna circle according to a first OAM mode may have a different channel gain than a signal produced by a second antenna circle (or a different antenna circle) according to the first OAM mode. To increase efficiency and throughput in the OAM-communications system, a transmitting device (e.g., the first device 205-*a*, the second device 210-*a*, a UE, base station, IAB node, relay node) or a receiving device (e.g., the first device 205-*a*, the second device 210-*a*, a UE, base station, IAB node, relay node), or both may determine a transmission scheme for the transmitting device to use for transmitting messages (e.g., data messages, control messages) to the receiving device. For example, the first device 205-*a* may be referred to as a transmitting device and the second device 210-*a* may be referred to as a receiving device, as the first device 205-*a* may transmit OAM transmissions 220 to the second device 210-*a*. The first device 205-*a*, or the second device 210-*a*, or both may be configured to determine which UCA circle, which OAM modes, or which combination of OAM modes of the first device 205-*a* may use to transmit according to each OAM mode so as to optimize data throughput of OAM transmissions 220 according to each OAM mode.

In some cases, the first device 205-*a* may transmit, to the second device 210-*a*, one or more signals 215 (e.g., one or more reference signals, one or more data packets, one or more data streams or the like) according to multiple OAM modes. For example, the first device 205-*a* may transmit a signal 215, which may be a single data stream or packet, using a combination of two or more OAM modes and respective UCA circle(s) for the combination of two or more modes, which may correspond to one or more UCA pairings (e.g., pair, combination) where each UCA pair includes a respective OAM modes and a respective set of UCA circles. The first device 205-*a* may transmit the signals 215 via communications link 225-*b*. In some examples, the one or more signals 215 may include signals 215 that are specific to OAM mode 0, which may be transmitted from a center antenna circle. The second device 210-*a* may receive one or more of the signals 215 and may perform measurements (e.g., channel gain, RSRP, SNR, RSRQ) on each of the received signals 215 using one or more OAM modes. In some cases, the second device 210-*a* may perform measurements on the signals 215 in accordance with control signaling received from the first device 205-*a*. For example, the first device 205-*a* may transmit control signaling to the second device 210-*a*, where the control information may include an indication that the first device 205-*a* may use multiple OAM modes when transmitting a signal 215, and an indication of a set of OAM modes used for transmitting the signal 215. The first device 205-*a* may transmit the signal 215, such as a single data packet or data stream, using a combination of OAM modes (e.g., the set of OAM modes). In some examples, the combination of OAM modes may include at least two adjacent modes (e.g., OAM mode 0 and OAM mode 1, or OAM mode 1 and OAM mode 2, or the like) The second device 210-*a* may receive the control information and may perform measurements on the signal 215 according to a set of OAM modes at the second device 210-*a*. In some cases, the second device 210-*a* may use the set of OAM modes as indicated in the control information, a set of OAM modes determined by the second device 210-*a*, or a combination thereof.

In some examples, the second device 210-*a* may transmit a measurement report 220 to the first device 205-*a*. For example, the second device 210-*a* may transmit measurement report 220 to the first device 205-*a* via communication link 225-*a* (e.g., an uplink communications link, a downlink communications link, a sidelink), where the measurement report 220 may include a signal strength of the received signal 215 (e.g., a total signal strength of the signal 215 measured using a combination of OAM modes at the second device 210-*a*). In some cases, the second device 210-*a* may selectively combine the signals 215 and may include measurements therefrom, within the measurement report 220. For example, the second device 210-*a* may include a signal strength from a first signal associated with a first OAM mode within the measurement report 220 and a signal strength from a second signal (or the first signal) associated with a second OAM mode within the measurement report 220. In other cases, the second device 210-*a* may coherently combine the signal measurements in the measurement report 220. For example, the second device 210-*a* may measure a total strength of the signals 215 using a set of OAM modes (e.g., all OAM modes configured at the second device 210-*a*, one or more OAM modes indicated by the first device 205-*a*, a set of OAM modes determined by the second device 210-*a*) and may include the total signal strength of the signals within the measurement report 220.

In some cases, second device 210-*a* may be configured to transmit measurement report 220, to the first device 205-*a*, including an indication of a selection of OAM modes. For example, the second device 210-*a* may be configured to receive signals 215 using one or more OAM modes, select a set of OAM modes from the one or more OAM modes, and transmit the selection of OAM modes to the first device 205-*a* (e.g., within measurement report 220). The second device 210-*a* may select the OAM modes based on signal measurements, for example, based on which of the set of OAM modes or which combination of OAM modes of the set of OAM modes has a highest RSRP, SNR, RSRQ, channel gain, or the like.

In some cases, the second device 210-*a* may be configured to transmit one or more measurement reports 220 to the first device 205-*a*. The measurement report 220 may indicate individual OAM mode measurements of the signal 215 as measured by the second device 210-a. For example, the second device 210-a may be configured to perform measurements on the signals 215 using three OAM modes. As such, the second device 210-a may transmit three measurement reports 220 each measurement report 220 associated with a respective OAM mode of the three OAM modes. Additionally, or alternatively, the second device 210-a may transmit a single measurement report 220 that includes three measurements, one for each of the three measured OAM modes.

The first device 205-a may receive measurement report(s) 220 including signal measurements (e.g., whether the signal measurements are associated with individual OAM modes or a combination of OAM modes), a selection of OAM modes, or a combination thereof. The first device 205-a may determine a set of OAM modes to use for subsequent signaling, for example, based on the signal measurements, the selection of OAM modes, or the like, as received in the measurement report(s) 220.

In some examples, the first device 205-a may transmit a configuration message 225 to the second device 210-a. The configuration message 225 may indicate the OAM modes (e.g., a combination of two or more OAM modes_determined by the first device 205-a, which may be used for subsequent signaling. In some examples, the OAM modes indicated in the configuration message 225 may be transmitter OAM modes (e.g., OAM modes used to transmit OAM signals), receiver OAM modes (e.g., OAM modes used to receive OAM signals), a combination thereof, or the like.

The second device 210-a may receive the configuration message 225 and may receive transmissions from the first device 205-a based on the configuration message 225. For example, the second device 210-a may use one or more OAM modes as indicated in the configuration message 225 to receive subsequent transmissions from the first device 205-a. Enabling the first device 205-a and the second device 210-a with the techniques as described herein may support for an enhanced determination of communication parameters (e.g., multiple OAM modes), higher signal throughput, and increased signal strength.

In some cases, the second device 210-a may transmit communication parameters 215, which may include channel gain measurements (or other reference signal measurements) associated with the selected OAM mode-UCA circle pairings, or measurements of each received reference signals, or a subset of measurements associated with each OAM mode, such as a number of the highest measurements. The first device 205-a may receive the report (e.g., communication parameters 215) and may identify the UCA circles the second device 210-a selected for each OAM mode. The first device 205-a may determine to use the OAM-mode-UCA circle pairings selected by the second device 210-a, or the first device 205-a may select different, or partially different pairings based on measurements performed by the first device 205-a, or based on the measurements received from the second device 210-a, or a combination thereof. In some cases, the first device 205-a may transmit a configuration message to the second device 210-a that indicates the OAM mode-UCA circle pairings the first device 205-a may transmit according to. The first device 205-a may transmit, to the second device 210-a, an OAM transmission (e.g., a data transmission, a control message transmission) via communication link 225-b (e.g., an uplink communications link, a downlink communications link, a sidelink) according to at least one OAM mode via the corresponding UCA circle selected for the OAM mode, where the OAM transmission may be transmitted via the transmission scheme indicated in the configuration message.

In some implementations, to select OAM mode-UCA circle pairings, the second device 210-a may be configured to determine one or more communication parameters 215 associated with the second device 210-a, the first device 205-a, or both, such as one or more channel parameters (e.g., path loss, communications distance) or one or more receiver parameters (e.g., receiver antenna circle radius). The second device 210-a may transmit an indication of the one or more communication parameters 215 to the first device 205-a, which the first device 205-a may use to select a transmitter circle for each OAM mode (e.g., OAM mode-transmitter circle pairing). For example, the first device 205-a may receive the one or more communication parameters 215 and perform one or more calculations based on the one or more communication parameters 215, such as channel gain measurements for each OAM mode and each UCA circle pairing. The first device 205-a may select a UCA circle for each OAM mode based on the one or more measurements. In some cases, the first device 205-a may transmit a configuration message to the second device 210-a that indicates the OAM mode-UCA circle pairings the first device 205-a intends to transmit according to. The first device 205-a may transmit, to the second device 210-a, an OAM transmission (e.g., a data transmission, a control message transmission) via communication link 225-b (e.g., an uplink communications link, a downlink communications link, a sidelink) according to at least one OAM mode via the corresponding UCA circle selected for the OAM mode, where the OAM transmission may be transmitted via the transmission scheme indicated in the configuration message.

Further, although shown as the first device 205-a transmitting an OAM transmission and the second device 210-a transmitting the communication parameters 215, the first device 205-a or the second device 210-a, or both, may transmit or receive an OAM transmission (e.g., an OAM beam) to or from each other, or other wireless devices, such as peer devices. For example, the first device 205-a may be a base station and the second device 210-a may be a base station, or the first device 205-a may be a UE and the second device 210-a may be a UE. In another example, the first device 205-a may be a base station and the second device may be a UE, or vice versa. Additionally, or alternatively, techniques as discussed herein may be used in communications between UEs, base stations, IAB nodes, relay nodes, access points, other wireless devices, or any combinations thereof.

Figure 3:
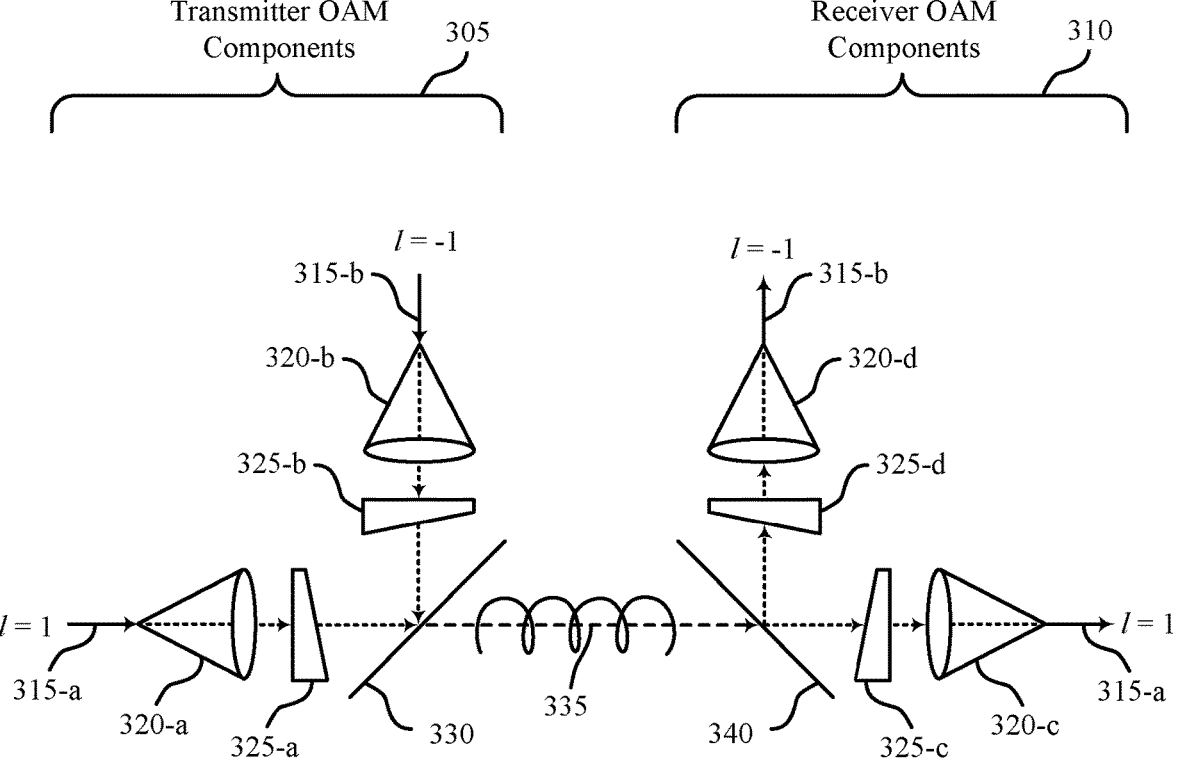
FIG. 3 illustrates an example of a spiral phase plate (SPP) OAM configuration that supports transmit diversity across orbital angular momentum modes in accordance with aspects of the present disclosure.

FIG. 3 illustrates an example of an SPP OAM configuration 300 that supports transmit diversity across OAM modes in accordance with aspects of the present disclosure. In some examples, the SPP OAM configuration 300 may implement aspects of wireless communications system 100 or 200. In this example, a transmitting device (e.g., UE or base station) may include transmitter OAM components 305 and a receiving device (e.g., UE or base station) may include receiver OAM components 310.

In cases in which the wireless devices use an SPP methodology, the transmitting device may convert an electromagnetic wave 315 associated with an OAM mode index $l=0$ (e.g., a non-helical electromagnetic wave associated with mode-zero OAM) into an electromagnetic wave associated with an OAM mode index $l \neq 0$ (e.g., a helical electromagnetic wave associated with a non-zero OAM mode) based on passing the electromagnetic wave through an aperture 320 (or an array of apertures 320) and an SPP 325.

Such an SPP 325 may be associated with geometric constraints and may be able to generate an electromagnetic wave associated with a single OAM mode. Thus, the wireless device may use one SPP 325 to generate an OAM beam 335 associated with one OAM mode. As such, a wireless device may implement a different SPP 325 for each OAM beam 335 that is associated with a different OAM mode.

In the example of FIG. 3, two OAM modes may be used (e.g., l.=+1 and −1). In the transmitter OAM components, a first electromagnetic wave 315-a may be provided to a first aperture 320-a and a first SPP 325-a, and a second electromagnetic wave 315-b may be provided to a second aperture 320-b and a second SPP 325-b. A beam splitter/combiner 330 may combine the output of the first SPP 325-a and the second SPP 325-b to generate OAM beam 335. The receiver OAM components 310 may receive the OAM beam 335 as a beam splitter/combiner 340 to provide instances of the OAM beam 335 to a third SPP 325-c and a fourth SPP 325-d that provide output to a first receiver aperture 320-c and a second receiver aperture 320-d, respectively. The third SPP 325-c may have geometric constraints corresponding to the first SPP 325-a and thus the output of the first receiver aperture 320-c may correspond to the first electromagnetic wave 315-a (e.g., for OAM Mode=1). Likewise, the fourth SPP 325-d may have geometric constraints corresponding to the second SPP 325-b and thus the output of the second receiver aperture 320-d may correspond to the second electromagnetic wave 315-b (e.g., for OAM Mode 1.=2). In devices that use SPP methodologies, separate SPPs 325-a may thus be used for each OAM mode, and the number of SPPs 325 at a device may constrain the number of usable OAM modes. As discussed, wireless devices may also use a UCA methodology for OAM communications, an example of which is discussed with reference to FIG. 4.

FIG. 4 illustrates an example of a UCA OAM configuration 400 that supports transmit diversity across OAM modes in accordance with aspects of the present disclosure. In some examples, the UCA OAM configuration 400 may implement aspects of wireless communications systems 100 or 200. In this example, a transmitting device (e.g., a UE or a base station) may include OAM transmitter UCA antennas 405 and a receiving device (e.g., a UE or a base station) may include OAM receiver UCA antennas 410.

In some aspects, one or both of the OAM transmitter UCA antennas 405 or the OAM receiver UCA antennas 410 may be implemented as a planar array of antenna elements which may be an example of or otherwise function as a (massive or holographic) MIMO array or an intelligent surface. In some cases, the transmitting device may identify a set of antenna elements 415 of the planar array that form a transmitter UCA, and a receiving device may identify a set of antenna elements 445 of the planar array that form a receiver UCA.

Upon selecting the set of antenna elements from the planar array, the OAM transmitter may apply a weight 435 to each of the selected antenna elements 415 based on the OAM mode index l of the transmitted OAM beam and one or more spatial parameters associated with each antenna element. In cases in which a UCA methodology is used to generate an OAM beam, the transmitting device may identify the set of antenna elements 415 on a circular array of antenna elements and may apply a first set of weights 420 to each of the identified antenna elements based on a first OAM mode index (e.g., l=0). Further, for other OAM mode indices, other weights may be used for the set of antenna elements 415, such as a second OAM mode index (e.g., l=+1) that may use a second set of weights 425 and a third OAM mode index (e.g., l=−1) that may use a third set of weights 430.

For example, to generate an OAM beam with an OAM mode index (e.g., l=0), the OAM transmitter may apply a weight 435 to each antenna element 415 on the UCA based on an angle 440 measured between a reference line on the UCA (e.g., the x-axis of the plane on which the UCA is located, where the origin is at the center of the UCA) and the antenna element 415, the OAM mode index l, and i (e.g., for complex-valued weights, which may alternatively be denoted as j in some cases). In some cases, for instance, the weight for an antenna element n may be proportional to $e^{i+l+\varphi n}$, where $\varphi_n$ is equal to the angle 440 measured between the reference line on the UCA and the antenna element n. By multiplying respective beamforming weights 435 of each set of weights 420-430 (e.g., for first set of weights 420, $w_1 = [w_{1,1}, w_{1,2}, \ldots, w_{1,8}]^T$) onto each antenna, a signal port may be generated. If the weight 435 of each antenna element 415 is equal to $e^{i\varphi l}$, where $\varphi$ is the angle of antenna 415 in the circle (e.g., angle 440 for antenna element 415-g), and l is the OAM mode index, then each set of weights 420-430 provides a beamformed port that is equivalent to OAM mode l. By using different beamforming weights $e^{i\varphi l'}$, where l'≈l, multiple OAM modes are thus generated.

In some examples, a transmit antenna element 415-i and a corresponding receive antenna element 445-i may function as a center node within the transmit and receive UCAs. The transmit antenna element 415-i and the receive antenna element 445-i may be associated with OAM mode 0, which may be dynamically configured or hard-coded. In some examples, the transmit antenna element 415-i may be the only transmit antenna element associated with OAM mode 0. In some other examples, both the transmit antenna element 415-i and optionally one or more additional transmit antenna elements (e.g., antenna elements 415-a and 415-d) may be associated with OAM mode 0. Likewise, the receive antenna element 445-i may be the only receive antenna element associated with OAM mode 0, or additional receive antenna elements (e.g., antenna elements 445-a and 445-c) may also be associated with OAM mode 0.

At the OAM receiver UCA antennas 410, the receiving device may have receive antenna elements 445 equipped in a circle. The channel matrix may be denoted from each transmit antenna to each receive antenna as H, and then for the beamformed channel matrix $\tilde{H} = H \cdot [w_1, w_2, \ldots, w_L]$, any two columns of $\tilde{H}$ may be orthogonal. In some examples, for N transmit antennas and N receive antennas, the transfer matrix H may be found via discreet angular sampling using Equation 7, shown below. In some cases, Equation 7 may omit a cosine factor in an amplitude of the Huygens-Fresnel formula.

$$H_{m,n} \propto \frac{\exp\left(jk\sqrt{z^2 + (r_1 - r_2\cos\theta_2)^2 +}\right)}{\sqrt{z^2 + (r_1\cos\theta_1 - r_2\cos\theta_2)^2 + (r_1\sin\theta_1 - r_2\sin\theta_2)^2}} = \frac{\exp\left\{jk\sqrt{z^2 + r_1^2 + r_2^2 - 2r_1r_2\cos(\theta_1 - \theta_2)}\right\}}{\sqrt{z^2 + r_1^2 + r_2^2 - 2r_1r_2\cos(\theta_1 - \theta_2)}} \tag{7}$$

In the example of Equation 7, beamformed ports may not experience crosstalk because of orthogonality between columns of the transfer matrix H. This may enable OAM-based communication to realize high-level spatial multiplexing more efficiently. Further, the eigen-based transmit precoding weights and receive combining weights of UCA-based OAM procedures may be equal to a discrete Fourier transform (DFT) matrix. Further, as the transfer matrix H is cyclic, eigenvectors of the transfer matrix H may be DFT vectors, as described in Equation 8.

$$v_u = \exp\left\{j\frac{2\pi\mu v}{N}\right\} \tag{8}$$

In the example of Equation 8, $\mu$ and $v$ may be integers within a range (e.g., $\mu$=0, 1, . . . (N–1), $v$=0, 1, . . . (N–1)), where $\mu$ is a vector index of a DFT vector and $v$ is the element index in each DFT vector. With respect to each OAM mode, the $\mu$-th DFT vector may correspond to the $\mu$-th OAM waveform. In some cases, with N transmit antennas and receive antennas, all OAM modes (e.g., 0, 1, . . . (N–1)) may be orthogonal at the receiver if any of them are transmitted, regardless of distance z and radii of the transmitter and receiver circles. As a result, per-mode channel estimation and feedback, such as that described with reference to FIGS. 2 and 5, may be used, rather than per-antenna pair feedback. In some cases, it may be beneficial to have both transmitter and receiver planes be co-axial and vertical to the z-axis, although the transmitter and the receiver antennas may have angular offsets, or may be in other configurations.

In some examples, the mode response of each receiver circle may be further analyzed according to Equation 9, which utilizes Taylor expansion approximations.

$$\sqrt{z^2 + r_1^2 + r_2^2 - 2r_1 r_2 \cos(\theta_1 - \theta_2)} = $$
$$z\sqrt{1 + \frac{r_1^2 + r_2^2 - 2r_1 r_2 \cos(\theta_1 - \theta_2)}{z^2}} \approx$$
$$z\left(1 + \frac{r_1^2 + r_2^2 - 2r_1 r_2 \cos(\theta_1 - \theta_2)}{2z^2}\right) = z + \frac{r_1^2 + r_2^2}{2z} - \frac{r_1 r_2 \cos(\theta_1 - \theta_2)}{z} \tag{9}$$

Equation 9 may then be incorporated into Equation 7, yielding Equation 10 as shown below.

$$H_{m,n} \propto \frac{\exp\left\{jk\sqrt{z^2 + r_1^2 + r_2^2 - 2r_1 r_2 \cos(\theta_1 - \theta_2)}\right\}}{\sqrt{z^2 + r_1^2 + r_2^2 - 2r_1 r_2 \cos(\theta_1 - \theta_2)}} \approx \tag{10}$$
$$\frac{\exp\left\{jkz\sqrt{1 + \frac{r_1^2 + r_2^2 - 2r_1 r_2 \cos(\theta_1 - \theta_2)}{2z^2}}\right\}}{z + \frac{r_1^2 + r_2^2}{2z} - \frac{2r_1 r_2 \cos(\theta_1 - \theta_2)}{z}} \approx$$
$$\frac{\exp\left\{jk\left(z + \frac{r_1^2 + r_2^2}{2z}\right)\right\}}{z}\exp\left\{\frac{-jkr_1 r_2 \cos(\theta_1 - \theta_2)}{z}\right\}$$

Without losing generality, Equation 10 may be simplified into Equation 11 based on setting $\theta_1$ to 0 and ignoring all common terms among receiver antennas.

$$H_{m,n} \propto \exp\left\{\frac{-jkr_1 r_2 \cos\theta}{z}\right\} = \exp\left\{-j2\pi\frac{r_1 r_2}{\lambda z}\cos\theta\right\} \tag{11}$$

In the example of Equation 11, $\theta$ may be associated with a range of angular values $$\left(\text{e.g.,} \ \theta = 0, \frac{2\pi}{N}, \ldots, \frac{2(N-1)\pi}{N}\right).$$

In Equation 11, analysis of N-DFT vectors of a first term $$\left(\text{e.g.,} \ \exp\left\{-j2\pi\frac{r_1 r_2}{\lambda z}\cos\theta\right\}\right)$$

may be performed within the range of angular values associated with $\theta_2$. If a sub-term $$\left(\text{e.g.,} \ \frac{r_1 r_2}{\lambda z}\right)$$

within the first term of Equation 11 is significantly lower than a threshold (e.g., 1), the critical term may be equivalent to $$1 - j2\pi\frac{r_1 r_2}{\lambda z}\cos\theta,$$

which may be an example of a low-pass filter. Alternatively, if the sub-term is higher than the threshold, the critical term may be highly oscillatory. In some cases, the sub-term may represent a spatial dimension with respect to a wavelength (e.g., $\lambda$) of an OAM wave. A response of a specific receiver antenna circle to different OAM modes may depend on geometric sizes and wavelengths corresponding to the receive antenna circle and an OAM wave, respectively.

In some examples, based on Equations 7 through 11, the same DFT matrix is the eigen-matrix, and this does not depend on communication parameters (e.g., distance, aperture size and carrier frequency), and thus UCA-based OAM procedures may be implemented at relatively low cost.

Figure 5:
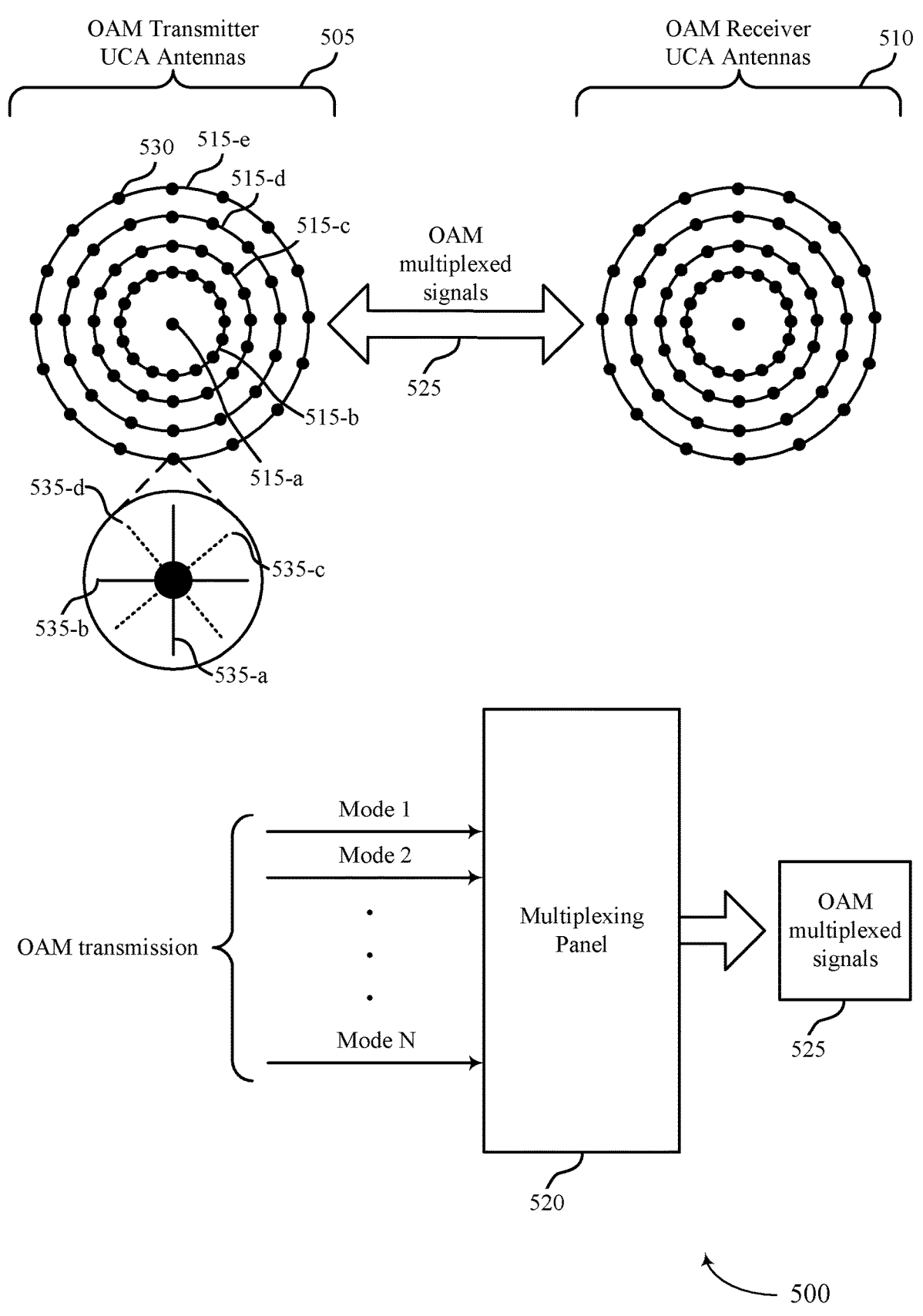
FIG. 5 illustrates an example of a multi-circle UCA-based OAM configuration that supports transmit diversity across orbital angular momentum modes in accordance with aspects of the present disclosure.

FIG. 5 illustrates an example of a multi-circle UCA-based OAM configuration 500 that supports transmit diversity across OAM modes in accordance with aspects of the present disclosure. In some examples, the multi-circle UCA-based OAM configuration 500 may implement aspects of wireless communications systems 100 or 200. In this example, a transmitting device (e.g., a UE or a base station) may include OAM transmitter UCA antennas 505 and a receiving device (e.g., a UE or a base station) may include OAM receiver UCA antennas 510.

As described with reference to FIG. 4, the transmitting device (e.g., an OAM transmitter) and the receiving device (e.g., an OAM receiver) may be configured with UCA antennas to realize OAM-based communications. In some implementations, the transmitting device and the receiving device may be configured with multiple UCA antenna circles 515. For example, the transmitting device and the receiving device may each be configured with multiple co-axis UCA antenna circles 515. That is, the transmitting device may be configured with OAM transmitter UCA antennas 505 and the receiving device may be configured with OAM receiver UCA antennas 510. The transmitting device and the receiving device may be configured with the same number of UCA circles 515, or a different number of UCA circles.

In the example depicted by FIG. 5, the transmitting device and the receiving device may each be configured with five antenna circles, where each antenna circle may include one or more antenna elements 530. However, it is to be understood that the transmitting device and the receiving device may each be configured with any number of antenna circles that include any number of antenna elements 530. For example, the transmitting device may be configured with UCA circles 515-*a*, 515-*b* 515-*c*, 515-*d*, and 515-*e*, where the number of antenna elements 530 included on each UCA circle 515 may be the same, different, or partially the same. For example, all UCA circles 515 may include the same number of antenna elements 530, or each UCA circle 515 may include a different number of antenna elements 530, or a subset of the UCA circles 515 may include the same number of antenna elements 530. In some cases, the number of antenna elements 530 included on each UCA circle 515 may be based on the radius of the UCA circle 515. Each of the UCA circles 515 that a device is configured with may have the same radius, or different radii, or some may be the same and some may be different. The UCA circles 515 of the transmitting device and the receiving device may be configured in any orientation. For example, the UCA circles 515 may each have a different radius and may be interleaved such that one UCA circle 515 sits inside another UCA circle 515, and so on, as depicted in FIG. 5.

In some examples, each antenna element 530 may be include perpendicular antenna sub-arrays 535. For example, an antenna element 530 may include perpendicular antenna sub-arrays 535-*a* and 535-*b* or perpendicular antenna sub-arrays 535-*c* and 535-*c*. Although illustrated with two potential perpendicular antenna sub-arrays 535, it is to be understood that the antenna elements 530 may be configured with any number of perpendicular antenna sub-arrays 535 that may be arranged in any orientation or configuration. For example, an antenna element 530 may be equipped with antenna sub-arrays 535 that are perpendicular with respect to an x-axis, a y-axis, or a z-axis, among other examples.

Configuring each antenna element 530 with perpendicular antenna sub-arrays 535 may enable the transmitting device to transmit OAM waveforms with different polarizations. For example, by applying different weights to each antenna sub-array 535, the transmitting device may transmit two OAM waveforms with different polarizations such that the two OAM waveforms are orthogonal to each other. As a result, the transmitting device may transmit the orthogonal OAM waveforms over a single channel without the orthogonal OAM waveforms interfering with each other.

In addition to OAM waveforms with different polarizations being orthogonal to each other, intra-circle OAM transmissions (e.g., OAM signals, OAM streams) may also be orthogonal to each other. That is, OAM transmissions from the same UCA circle 515 may not interfere with one another. As such, OAM transmissions from the same UCA circle 515 that are transmitted according to different OAM states or modes may be multiplexed together to increase the capacity of an OAM link.

In some cases, inter-circle OAM transmissions may be orthogonal with different OAM modes, such that OAM transmissions from different UCA circles 515 transmitted according to different OAM modes may be orthogonal to one another. In some cases, inter-circle OAM transmissions may be non-orthogonal with OAM transmissions of the same OAM mode, such that OAM transmissions from different UCA circles 515 transmitted according to the same OAM mode may cause interference (e.g., cross-talk) with another other. For each OAM mode, inter-circle interference may occur when an OAM transmission from one UCA circle 515 mutually interferes with an OAM transmission transmitted from another UCA circle 515, where the two OAM transmissions have the same OAM mode.

As an example, multiple OAM transmissions may be transmitted from each UCA circle 515, where the intra-circle transmissions may be multiplexed if the intra-circle transmissions are associated with different modes. For example, the transmitting device may transmit a first OAM transmission according to OAM mode 1 via UCA circle 515-*e* and a second OAM transmission according to OAM mode 2 via UCA circle 515-*e*. Similarly, the transmitting device may transmit a third OAM transmission according to OAM mode 1 via UCA circle 515-*d*, a fourth OAM transmission according to OAM mode 2 via UCA circle 515-*d*, a fifth OAM transmission according to OAM mode 1 via UCA circle 515-*c*, a sixth OAM transmission according to OAM mode 2 via UCA circle 515-*c*, a seventh OAM transmission according to OAM mode 1 via UCA circle 515-*b*, and an eighth OAM transmission according to OAM mode 2 via UCA circle 515-*b*.

In some examples, the transmitting device may transmit one or more OAM transmissions according to OAM mode 0 via UCA circle 515-*a*. The UCA circle 515-*a* may be referred to herein as a center, a center circle, a center antenna circle, or a center antenna node and may include a single antenna component or multiple antenna components (e.g., in an antenna array or panel). UCA circle 515-*a* may be a transmitter configured for the transmitting or receiving device, and may be used for communications according to different modes or polarizations. In some cases, only UCA circle 515-*a* may transmit OAM transmissions according to OAM mode 0. In some other cases, the center UCA circle 515-*a* and one or more peripheral UCA circles 515 (e.g., UCA circles 515-*e* and 515-*d*) may transmit OAM transmissions according to OAM mode 0. That is, either the center UCA circle 515-*a* is chosen as the only transmitter or the center and another UCA circle 515 are the transmitters for OAM mode 0.

The center UCA circle 515-*a* may transmit reference signals that are unique to the center node. That is, the center UCA circle 515-*a* may transmit reference signals that are specific to OAM mode 0. In addition, the center UCA circle 515-*a* may have reference signal resources that are reserved for the center UCA circle 515-*a*. The transmitting device, the receiving device, or both may determine which UCA circles 515 to associate with OAM mode 0 based on the transmitting device using the reserved reference signal resources to transmit one or more reference signals that are unique to the center UCA circle 515-*a*. In some examples, the one or more reference signals may have different polarizations, such that the receiving device may measure the one or more reference signals and indicate a preferred polarization to the transmitting device.

In some examples, one or more higher OAM modes (e.g., OAM modes other than OAM mode 0) may have a natural null at the center UCA circle 515-*a*. That is, OAM transmissions that are transmitted from a peripheral UCA circle 515 (e.g., UCA circle 515-*e*) according to a higher OAM mode may be orthogonal to OAM transmissions transmitted from the center UCA circle 515-*a* according to OAM mode 0. As a result, the transmitting device may be able to multiplex a first OAM transmission from a peripheral UCA circle 515 with a second OAM transmission from the center UCA circle 515-*a*.

As described herein, OAM transmissions corresponding to different OAM modes may be orthogonal. As such, a first OAM transmission corresponding to a first OAM mode and a second OAM transmission corresponding to a second OAM mode (different from the first OAM mode) may be orthogonal to one another, and may, in some cases, be multiplexed. Similarly, a third and a fourth OAM transmissions, corresponding to a third and fourth OAM mode, respectively, may be orthogonal to one another. This may extend to any number of OAM mode combinations, such that OAM transmissions corresponding to OAM modes 1 through N (an integer N representing an upper bound of OAM modes), may be orthogonal to one another. Further, the fifth and sixth transmissions may be orthogonal to one another, and the seventh and the eighth transmission may be orthogonal to one another. As described herein, inter-circle OAM transmissions transmitted via different OAM modes may be orthogonal. As such, the first transmission may be orthogonal to the fourth transmission, the sixth transmission, and the eight transmission, for example. Further, as described herein, inter-circle OAM transmissions transmitted via the same OAM mode may be non-orthogonal. As such, the first transmission may be non-orthogonal to the third transmission, the fifth transmission, and the seventh transmission, for example.

In some cases, a transmitting device may transmit the first transmission through the eighth transmission or any number of orthogonal OAM transmissions, as described herein, simultaneously. As such, the first transmission through the Nth transmission may pass through a multi-circle UCA panel, such as multiplexing panel 520, that may multiplex one or more of the transmissions into OAM multiplexed signals 525. In some examples, OAM transmissions using orthogonal OAM modes may be multiplexed. For example, the first transmission and the second transmission may be multiplexed. In another example, the first transmission through the Nth transmission may be multiplexed. The transmitting device may transmit the one or more OAM multiplexed signals 525 to the receiving device, where the OAM receiver UCA antennas 510 of the receiving device may separate the one or more OAM multiplexed signals.

Further, although shown in the example depicted in FIG. 5 as using two OAM modes (a first and a second mode) being transmitted by each UCA circle 515, it is to be understood that each UCA circle 515 may transmit any number of OAM transmissions according to any number of OAM modes. The number of OAM transmissions from each UCA circle 515 may be the same, different, or partially the same, such that all UCA circles 515 at the transmitting device may transmit the same number of transmissions, a different number of transmissions, or some UCA circles 515 may transmit the same number of transmissions while other UCA circles may transmit a different number of transmissions. Further, although the transmitting device and the receiving device are depicted in FIG. 5 as being configured with 5 UCA circles 515, it is to be understood that such devices may be configured with any number of UCA circles 515.

In some cases, as inter-circle OAM transmissions of the same OAM mode may interfere with one another, the transmitting device may be configured to transmit a particular mode via a particular UCA circle 515 so as to mitigate interference caused by inter-cell OAM transmissions of the same mode. In some cases, an OAM transmitter, or an OAM receiver, or both may be configured to determine which OAM modes (or which combination of OAM modes) the OAM transmitter (e.g., via the OAM transmitter UCA antennas 505) may use to transmit to increase the capacity of an OAM link and optimize data throughput of OAM transmissions 220.

In some cases, the OAM transmitter may transmit, to the OAM receiver, one or more signals (e.g., in a data stream, as data packets, as reference signals, or the like) using to multiple OAM modes. For example, the OAM transmitter may transmit using, for example using UCA circle 515-b, one or more signals using a combination (e.g., a multiplexing) of two or more OAM modes. The OAM receiver may receive one or more of the signals and may perform measurements (e.g., channel gain, RSRP, SNR, RSRQ) on each of the received signals using one or more OAM modes. In some cases, the OAM receiver may perform measurements on the signals in accordance with control signaling received from the OAM transmitter. For example, the OAM transmitter may transmit control signaling to the OAM receiver, where the control information may include an indication that the OAM transmitter may use multiple OAM modes when transmitting signals, an indication of which OAM modes the OAM transmitter may use when transmitting signals, an indication of which OAM modes the OAM receiver may use when receiving signals, or a combination thereof. The OAM receiver may receive the control information and may perform measurements on the signals using a set of OAM modes. In some cases, the OAM receiver may use a set of OAM modes as indicated in the control information, a set of OAM modes determined by the OAM receiver, or a combination thereof.

In some examples, the OAM receiver may transmit a measurement report to the OAM transmitter. For example, the OAM receiver may transmit a measurement report, including an indication of a signal strength (e.g., a total signal strength) of the received signals for one or more OAM modes used by the OAM receiver. In some cases, the OAM receiver may transmit the measurement report in accordance with control signaling from the OAM transmitter. For example, the OAM transmitter may transmit control signaling, to the OAM receiver, instructing the OAM receiver to transmit the measurement report including measurement information associated with multiple OAM modes. In such an example, the OAM receiver may receive the control signaling, receive signals using one or more OAM modes, and the transmit measurement report to the OAM transmitter. In some cases, the OAM receiver may measure the signals using individual OAM modes, acquiring signal strength information corresponding to each OAM mode configured at the OAM receiver (e.g., configured by control signaling, pre-determination at the OAM receiver, OAM receiver capability). In some cases, the OAM receiver may selectively combine the signals, perform measurements, and provide such measurements in the measurement report. For example, the OAM receiver may measure a first signal strength for a first signal associated with a first OAM mode and include the first signal strength within the measurement report. The OAM receiver may then measure a second signal strength for a second signal (or the first signal) associated with a second OAM mode and include the second signal strength within the measurement report. In cases where the signals may be data packets, the OAM receiver may selectively combine the signal measurements based on the OAM receiver decoding a data packet successfully using at least one OAM mode (e.g., if one OAM mode is successfully received or decoded by the OAM receiver). In other cases, the OAM receiver may coherently combine the signals (e.g., for joint decoding), perform measurements on the signals, and provide such measurements within the measurement report. For example, the OAM receiver may measure a total strength of the signals over a set of OAM modes (e.g., all OAM modes configured at the OAM receiver, one or more OAM modes indicated by the OAM transmitter, a set of OAM modes determined by the OAM receiver) and may include the total signal strength of the signals within the measurement report.

In some cases, the OAM receiver may be configured to transmit the measurement report, to the OAM transmitter, including an indication of a selection of OAM modes. That is, in some cases, the OAM receiver may be configured to receive signals using one or more OAM modes, select a set of OAM modes from the one or more OAM modes, and transmit the selection of OAM modes to the OAM transmitter (e.g., as or within the measurement report, or another signal). The OAM receiver may select the OAM modes based on signal measurements, for example, based on RSRP, SNR, RSRQ, channel gain, or the like, measurements associated with each OAM mode successfully received by the OAM receiver. For instance, the OAM receiver may select two or more OAM modes having the highest signal measurements among all OAM modes that were successfully received by the OAM receiver. In some cases, the OAM receiver may transmit the selection of OAM modes based on receiving control signaling, from the OAM transmitter, configuring the OAM receiver to transmit the selection of OAM modes. In other cases, the OAM receiver may transmit the selection of OAM modes according to a predetermined configuration at the OAM receiver, among other triggers for transmitting the selection of OAM modes.

In some cases, the OAM receiver may be configured to transmit one or more measurement reports, to the OAM transmitter indicating individual mode measurements. In other words, the OAM receiver may perform signal measurements on the signals using one or more OAM modes, where the OAM receiver may transmit one or more measurement reports, to the OAM transmitter, each measurement report corresponding to a respective OAM mode measurement. For example, the OAM receiver may receive signals and may be configured to perform measurements on the signals using three OAM modes. As such, the OAM receiver may transmit three measurement reports to the OAM transmitter where a first measurement report may include a signal measurement associated with a first OAM mode (e.g., with an OAM mode of index of l=0), a second measurement report may include a signal measurement associated with a second OAM mode (e.g., with an OAM mode index of l=−1), and a third measurement report may include a signal measurement associated with a third OAM mode (e.g., with an OAM mode index of l=−2).

The OAM transmitter may receive measurement report(s) including signal measurements (e.g., whether the signal measurements are associated with individual OAM modes or a combination of OAM modes), a selection of OAM modes, or a combination thereof. The OAM transmitter may determine a set of OAM modes to use for subsequent signaling, for example, based on the signal measurements, the selection of OAM modes, or the like, as received in the measurement report(s). The OAM transmitter may determine the set of OAM modes to be the selection of OAM modes, a set of OAM modes independently determined by the OAM transmitter, a set of OAM modes determined based on the measurement report, or a combination thereof.

The OAM transmitter may be configured to transmit a configuration message to the OAM receiver, indicating the OAM modes determined by the OAM transmitter, which may be used for subsequent signaling. In some examples, the OAM modes indicated in the configuration message may be transmitter OAM modes (e.g., OAM modes used to transmit OAM signals), receiver OAM modes (e.g., OAM modes used to receive OAM signals), a combination thereof, or the like.

The OAM receiver may receive the configuration message and may receive transmissions from the OAM transmitter based thereon. For example, the OAM receiver may configure itself to use one or more OAM modes as indicated in the configuration message to receive subsequent transmissions from the OAM transmitter.

The transmitting device, or the receiving device, or both may be configured to determine a transmission scheme for the transmitting device that indicates which UCA circle 515 should be used to transmit which OAM mode. In some implementations, the channel gains of OAM transmission streams may be different from each UCA circle 515 for each OAM mode for a set of parameters. The parameters may include system parameters such as a communication distance between the transmitting device and the receiving device, the radius of each UCA transmitter circle 515, the radius of each UCA receiver circle 515, a carrier frequency, or a number of antenna elements 530 in each UCA circle 515.

For example, for a set of system parameters (in which the parameters are held constant), an OAM mode of 2 or −2 may have a largest channel gain when transmitted via a UCA transmitter circle radius of 0.8 meters. In another example, for the same set of system parameters, an OAM mode of 1 or −1 may have a largest channel gain when transmitted via a UCA transmitter circle radius of 0.6 meters. In another example, for the same set of system parameters, an OAM mode of 0 may have a largest channel gain when transmitted via a UCA transmitter circle radius of 0.2 meters. Therefore, to achieve high data throughput, a transmitting device may be configured to transmit an OAM transmission via an OAM mode-UCA circle pairing that results in the largest channel gain. This low-complexity scheme may increase peak data rates and channel capacity without impairing orthogonality. However, it is to be understood that any number of alternative low-complexity schemes involving OAM transmitter circles with different radii may also be used to improve peak data rates and channel capacity.

As described with reference to FIGS. 2 and 6, the OAM transmitter, the OAM receiver, or both, may be configured to determine a UCA circle 515 for each OAM mode or a set of OAM modes (e.g., a combination of two or more OAM modes) to use for subsequent communications. As described with reference to FIGS. 2, 5, 6, and 7, the transmitting device may be configured to select a set of OAM modes (e.g., based on OAM receiver feedback), resulting in enhanced determination of communication parameters (e.g., multiple OAM modes), higher signal throughput, and increased signal strength.

FIG. 6 illustrates an example of a process flow 600 that supports transmit diversity across OAM modes in accordance with aspects of the present disclosure. The process flow 600 may illustrate an example transmit diversity selection procedure. For example, a first device 205-b (e.g., a transmitting device), or a second device 210-b (e.g., a receiving device), or both may perform techniques to determine OAM modes to use for transmitting/receiving signaling. The first device 205-b and the second device 210-b may be examples of the corresponding devices (e.g., wireless devices) described with reference to FIGS. 1 through 5, where the first device 205-b and the second device 210-b may be the same device or may be different devices. The first device 205-*b* and the second device 210-*b* may each be a UE, a base station, or an IAB node, among other devices. Alternative examples of the following may be implemented, where some steps are performed in a different order than described or are not performed at all. In some cases, steps may include additional features not mentioned below, or further steps may be added.

At 605, the first device 205-*b* may select one or more OAM modes. For example, the first device 205-*b* may select a subset of OAM modes for a transmit diversity scheme associated with communications between the first device 205-*b* and the second device 210-*b*. In some cases, the subset of OAM modes may include multiple OAM modes. For example, the subset of OAM modes may include a first OAM mode, a second OAM mode, and so on. In some examples, the subset of OAM modes may be transmission OAM modes (e.g., OAM modes the first device 205-*b* may use to transmit signaling to the second device 210-*b*), reception OAM modes (e.g., OAM modes the first device 210-*b* may use to receive signaling from the first device 205-*b*), or a combination thereof.

At 610, the first device 205-*b* may transmit a configuration indication to the second device 210-*b*. The configuration indication may include an indication of a transmit diversity scheme with which the first device 205-*b* and the second device 210-*b* may use to communicate. In some examples, transmit diversity scheme may indicate the subset of OAM modes selected by the first device 205-*b* at 605.

At 615, the first device 205-*b* may transmit control information to the second device 210-*b*, providing instructions, parameters, or the like, for the second device 210-*b* to transmit feedback to the first device 205-*b* as part of the transmit diversity scheme. In some examples, the first device 205-*b* may transmit a control message instructing the second device 210-*b* to provide feedback for a data packet based on (e.g., in accordance with) the subset of OAM modes selected at 605. In some cases, the first device 205-*b* may transmit a control message indicating the transmit diversity scheme for transmission of the data packet, such that the second device 210-*b* may transmit feedback for subsequent signaling based on the indicated transmit diversity scheme.

At 620, the second device 210-*b* may monitor for signaling from the first device 205-*b* as part of the transmit diversity scheme. The second device 210-*b* may monitor for the signaling using the subset of OAM modes as indicated in the configuration indication at 610, one or more OAM modes from the subset of OAM modes, one or more OAM modes determined at the second device 210-*b*, all OAM modes configured at the second device 210-*b* or the like.

At 625, the first device 205-*b* may transmit signaling (e.g., data packets, signals, reference signals, information within a data stream) to the second device 210-*b* using a set of transmitter circles of the first device 205-*b*. As such, the second device 210-*b* may receive the signaling from the first device 205-*b*, using one or more receiver circles of the second device 210-*b*, and may perform signal measurements based thereon. In some cases (e.g., where the signals may be data packets), the second device 210-*b* may selectively combine the signal measurements (e.g., using individual OAM modes) based on the second device 210-*b* decoding a data packet successfully using at least one OAM mode. In other cases, the second device 210-*b* may coherently combine the signals (e.g., for joint decoding), combining multiple OAM modes.

At 630, the second device 210-*b* may determine signal strength measurements based on performing measurements (e.g., RSRP, RSRQ, SNR, channel gain) on the signaling received at 625. In some examples, the second device 210-*b* may determine a respective signal strength measurement for each OAM mode of a set of OAM modes, all OAM modes of a set of OAM modes combined, or the like.

In some cases, at 635, the second device 210-*b*, may select a set of OAM modes. For example, the second device 210-*b* may be configured to receive the signals at 625, and select a set of (preferred) OAM modes. In some examples, the second device 210-*b* may select the set of OAM modes to be a set of OAM modes for the transmitter to use for subsequent transmissions. Additionally, or alternatively, the second device 210-*b* may select the set of OAM modes to be a set of OAM modes for the receiver to use for subsequent transmissions.

At 640, the second device 210-*b* may transmit a feedback message, to the first device 205-*b*, indicating signal strength measurements determined at 630, OAM modes selected at 635, or a combination thereof. In some cases, the second device 210-*b* may transmit the feedback message, including a total signal strength measurement, where the second device 210-*b* selectively combined the signals received at 625, coherently combined the signals received at 625, or the like. In some cases, the second device 210-*b* may transmit the feedback message indicating a total strength of the signals received at 625 using the set of OAM modes selected at 635. In other cases, the second device 210-*b* may transmit a feedback message, including a respective total signal strength, each total signal strength corresponding to an OAM mode of a set of OAM modes that the second device 210-*b* used to receive the signaling at 625. Alternatively, the second device 210-*b* may transmit multiple feedback messages, each feedback message including a total signal strength and each total signal strength corresponding to an OAM mode of the set of OAM modes that the second device 210-*b* used to receive the signaling at 625.

At 645, the first device 205-*b* may transmit control information to the second device 210-*b*, indicating the transmit diversity scheme which the first device 205-*b* may use for subsequent signaling. For example, the first device 205-*b* may receive the feedback message at 640, determine a set of OAM modes for subsequent signaling, and transmit the control information 645 to the second device 210-*b*. The first device 205-*b* may determine the set of OAM modes based on the signal strength measurements included in the feedback message at 640, the selected OAM modes from the second device 210-*b*, determination at the first device 205-*b*, or a combination thereof.

Configuring devices to use the techniques as described herein may support enhanced determination of satisfactory OAM modes to use when multiplexing OAM transmissions, which may result in increased signal throughput, lower communications latency, and more continuous OAM signal coverage.

Figure 7:
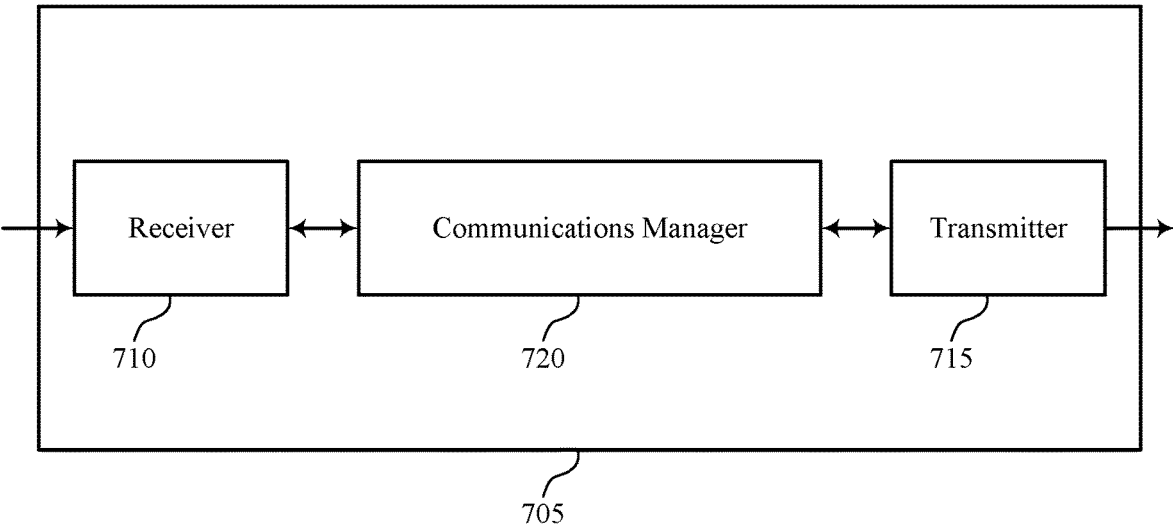
FIGS. 7 and 8 show block diagrams of devices that support transmit diversity across orbital angular momentum modes in accordance with aspects of the present disclosure.

FIG. 7 shows a block diagram 700 of a device 705 that supports transmit diversity across orbital angular momentum modes in accordance with aspects of the present disclosure. The device 705 may be an example of aspects of a UE 115 or a base station 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to transmit diversity across orbital angular momentum modes). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to transmit diversity across orbital angular momentum modes). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of transmit diversity across orbital angular momentum modes as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first device in accordance with examples as disclosed herein. For example, the communications manager 720 may be configured as or otherwise support a means for selecting, from a set of multiple orbital angular momentum modes, a subset of orbital angular momentum modes for a transmit diversity scheme associated with communications between the first device and a second device, the subset including a first orbital angular momentum mode of the set of multiple orbital angular momentum modes and a second orbital angular momentum mode of the set of multiple orbital angular momentum modes. The communications manager 720 may be configured as or otherwise support a means for transmitting, to the second device, an indication of the transmit diversity scheme associated with communications between the first device and the second device, the transmit diversity scheme indicating the subset of orbital angular momentum modes. The communications manager 720 may be configured as or otherwise support a means for transmitting, based on the transmit diversity scheme, a data packet to the second device using a set of transmitter circles of the first device, the set of transmitter circles corresponding to both the first orbital angular momentum mode and the second orbital angular momentum mode.

Additionally or alternatively, the communications manager 720 may support wireless communications at a first device in accordance with examples as disclosed herein. For example, the communications manager 720 may be configured as or otherwise support a means for receiving, from a second device, an indication of the transmit diversity scheme associated with communications between the first device and the second device, the transmit diversity scheme indicating a set of multiple orbital angular momentum modes for one or more signals from the first device. The communications manager 720 may be configured as or otherwise support a means for monitoring for the one or more signals from the first device based on the transmit diversity scheme. The communications manager 720 may be configured as or otherwise support a means for transmitting a feedback message to the second device based on the monitoring, the feedback message indicating one or more signal strength measurements for one or more orbital angular momentum modes of the set of multiple orbital angular momentum modes, the one or more signal strength measurements associated with the one or more signals.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for more efficient utilization of communication resources, improved throughput, and higher likelihood of decoding success by using multiple OAM modes for communicating a single data packet or data stream. Such techniques may increase communication efficiency, which may reduce power consumption and increase battery life.

Figure 8:
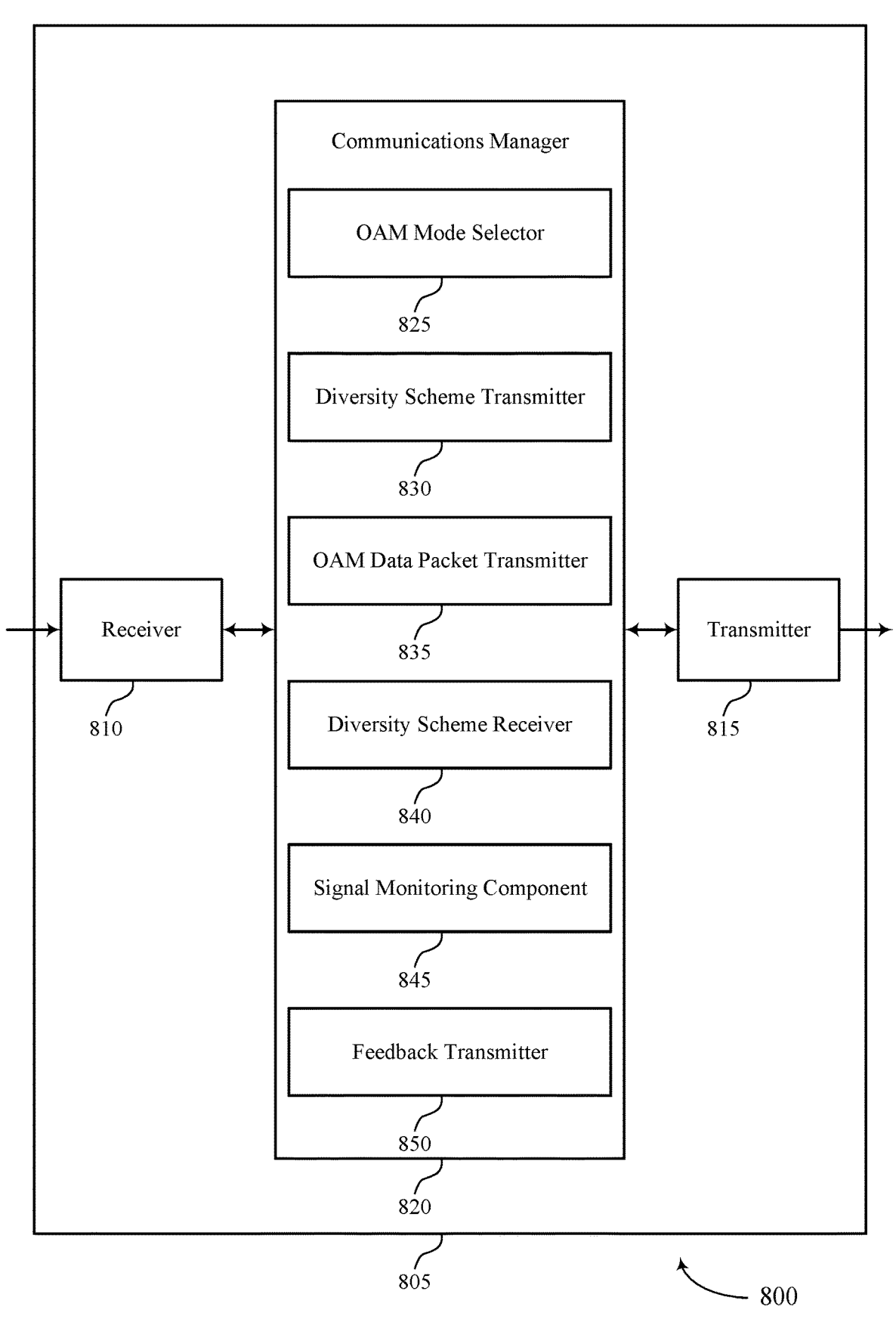

FIG. 8 shows a block diagram 800 of a device 805 that supports transmit diversity across orbital angular momentum modes in accordance with aspects of the present disclosure. The device 805 may be an example of aspects of a device 705, a UE 115, or a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to transmit diversity across orbital angular momentum modes). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to transmit diversity across orbital angular momentum modes). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of transmit diversity across orbital angular momentum modes as described herein. For example, the communications manager 820 may include a OAM mode selector 825, a diversity scheme transmitter 830, a OAM data packet transmitter 835, a diversity scheme receiver 840, a signal monitoring component 845, a feedback transmitter 850, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a first device in accordance with examples as disclosed herein. The OAM mode selector 825 may be configured as or otherwise support a means for selecting, from a set of multiple orbital angular momentum modes, a subset of orbital angular momentum modes for a transmit diversity scheme associated with communications between the first device and a second device, the subset including a first orbital angular momentum mode of the set of multiple orbital angular momentum modes and a second orbital angular momentum mode of the set of multiple orbital angular momentum modes. The diversity scheme transmitter 830 may be configured as or otherwise support a means for transmitting, to the second device, an indication of the transmit diversity scheme associated with communications between the first device and the second device, the transmit diversity scheme indicating the subset of orbital angular momentum modes. The OAM data packet transmitter 835 may be configured as or otherwise support a means for transmitting, based on the transmit diversity scheme, a data packet to the second device using a set of transmitter circles of the first device, the set of transmitter circles corresponding to both the first orbital angular momentum mode and the second orbital angular momentum mode.

Additionally or alternatively, the communications manager 820 may support wireless communications at a first device in accordance with examples as disclosed herein. The diversity scheme receiver 840 may be configured as or otherwise support a means for receiving, from a second device, an indication of the transmit diversity scheme associated with communications between the first device and the second device, the transmit diversity scheme indicating a set of multiple orbital angular momentum modes for one or more signals from the first device. The signal monitoring component 845 may be configured as or otherwise support a means for monitoring for the one or more signals from the first device based on the transmit diversity scheme. The feedback transmitter 850 may be configured as or otherwise support a means for transmitting a feedback message to the second device based on the monitoring, the feedback message indicating one or more signal strength measurements for one or more orbital angular momentum modes of the set of multiple orbital angular momentum modes, the one or more signal strength measurements associated with the one or more signals.

Figure 9:
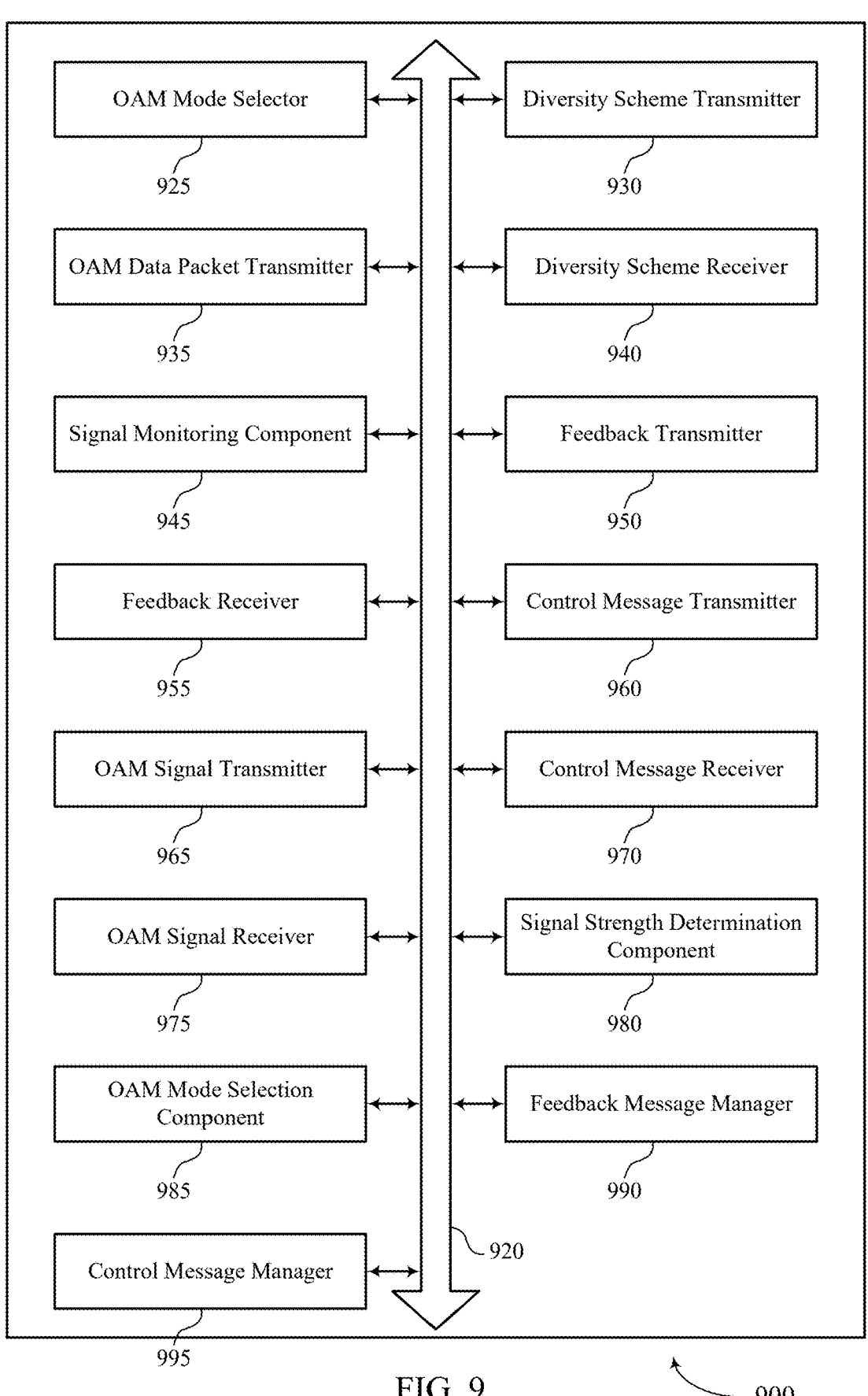
FIG. 9 shows a block diagram of a communications manager that supports transmit diversity across orbital angular momentum modes in accordance with aspects of the present disclosure.

FIG. 9 shows a block diagram 900 of a communications manager 920 that supports transmit diversity across orbital angular momentum modes in accordance with aspects of the present disclosure. The communications manager 920 may be an example of aspects of a communications manager 720, a communications manager 820, or both, as described herein. The communications manager 920, or various components thereof, may be an example of means for performing various aspects of transmit diversity across orbital angular momentum modes as described herein. For example, the communications manager 920 may include a OAM mode selector 925, a diversity scheme transmitter 930, a OAM data packet transmitter 935, a diversity scheme receiver 940, a signal monitoring component 945, a feedback transmitter 950, a feedback receiver 955, a control message transmitter 960, a OAM signal transmitter 965, a control message receiver 970, a OAM signal receiver 975, a signal strength determination component 980, a OAM mode selection component 985, a feedback message manager 990, a control message manager 995, or any combination thereof. Each of these components may communicate, directly or indirectly, with one another (e.g., via one or more buses).

The communications manager 920 may support wireless communications at a first device in accordance with examples as disclosed herein. The OAM mode selector 925 may be configured as or otherwise support a means for selecting, from a set of multiple orbital angular momentum modes, a subset of orbital angular momentum modes for a transmit diversity scheme associated with communications between the first device and a second device, the subset including a first orbital angular momentum mode of the set of multiple orbital angular momentum modes and a second orbital angular momentum mode of the set of multiple orbital angular momentum modes. The diversity scheme transmitter 930 may be configured as or otherwise support a means for transmitting, to the second device, an indication of the transmit diversity scheme associated with communications between the first device and the second device, the transmit diversity scheme indicating the subset of orbital angular momentum modes. The OAM data packet transmitter 935 may be configured as or otherwise support a means for transmitting, based on the transmit diversity scheme, a data packet to the second device using a set of transmitter circles of the first device, the set of transmitter circles corresponding to both the first orbital angular momentum mode and the second orbital angular momentum mode.

In some examples, the feedback receiver 955 may be configured as or otherwise support a means for receiving, from the second device, a feedback message for the data packet, the feedback message indicating a signal strength of the data packet and one or more orbital angular momentum modes for the transmit diversity scheme.

In some examples, the control message transmitter 960 may be configured as or otherwise support a means for transmitting a control message corresponding to the data packet, the control message instructing the second device to provide feedback for the data packet based on the first orbital angular momentum mode and the second orbital angular momentum mode.

In some examples, the feedback receiver 955 may be configured as or otherwise support a means for receiving, from the second device, a feedback message for the data packet, the feedback message indicating a signal strength of the data packet for a combination of the first orbital angular momentum mode and the second orbital angular momentum mode.

In some examples, the control message transmitter 960 may be configured as or otherwise support a means for transmitting a control message corresponding to the data packet, the control message indicating the transmit diversity scheme for transmission of the data packet.

In some examples, the OAM signal transmitter 965 may be configured as or otherwise support a means for transmitting one or more signals using a set of multiple transmitter circles of the first device, the set of multiple transmitter circles corresponding to the set of multiple orbital angular momentum modes. In some examples, the feedback receiver 955 may be configured as or otherwise support a means for receiving, from the second device, a feedback message for the one or more signals, the feedback message indicating a combination of one or more orbital angular momentum modes of the set of multiple orbital angular momentum modes and a signal strength corresponding to the combination of the one or more orbital angular momentum modes.

In some examples, to support selecting the subset of orbital angular momentum modes, the OAM mode selector 925 may be configured as or otherwise support a means for selecting the subset of orbital angular momentum modes based on the feedback message, where the subset includes the combination of the one or more orbital angular momentum modes.

In some examples, the feedback message indicates which of the set of multiple orbital angular momentum modes are combined by the second device.

In some examples, the OAM signal transmitter 965 may be configured as or otherwise support a means for transmitting one or more signals using a set of multiple transmitter circles of the first device, the set of multiple transmitter circles corresponding to the set of multiple orbital angular momentum modes. In some examples, the feedback receiver 955 may be configured as or otherwise support a means for receiving, from the second device, a feedback message for the one or more signals, the feedback message indicating a respective signal strength for each of the set of multiple orbital angular momentum modes.

In some examples, to support selecting the subset of orbital angular momentum modes, the OAM mode selector 925 may be configured as or otherwise support a means for selecting the subset of orbital angular momentum modes based on the respective signal strengths for each of the set of multiple orbital angular momentum modes.

Additionally or alternatively, the communications manager 920 may support wireless communications at a first device in accordance with examples as disclosed herein. The diversity scheme receiver 940 may be configured as or otherwise support a means for receiving, from a second device, an indication of the transmit diversity scheme associated with communications between the first device and the second device, the transmit diversity scheme indicating a set of multiple orbital angular momentum modes for one or more signals from the first device. The signal monitoring component 945 may be configured as or otherwise support a means for monitoring for the one or more signals from the first device based on the transmit diversity scheme. The feedback transmitter 950 may be configured as or otherwise support a means for transmitting a feedback message to the second device based on the monitoring, the feedback message indicating one or more signal strength measurements for one or more orbital angular momentum modes of the set of multiple orbital angular momentum modes, the one or more signal strength measurements associated with the one or more signals.

In some examples, to support transmitting the feedback message, the feedback transmitter 950 may be configured as or otherwise support a means for transmitting a total signal strength of the one or more signals for a combination of multiple orbital angular momentum modes of the set of multiple orbital angular momentum modes.

In some examples, the control message receiver 970 may be configured as or otherwise support a means for receiving a control message for a data packet, the control message instructing the second device to provide feedback for the data packet based on a combination of a first orbital angular momentum mode and a second orbital angular momentum mode of the set of multiple orbital angular momentum modes, where the one or more signal strength measurements for the one or more orbital angular momentum modes correspond to the combination of the first orbital angular momentum mode and the second orbital angular momentum mode.

In some examples, the control message includes the indication of the transmit diversity scheme.

In some examples, the control message receiver 970 may be configured as or otherwise support a means for receiving a control message for a data packet, the control message including the indication of the transmit diversity scheme.

In some examples, the OAM signal receiver 975 may be configured as or otherwise support a means for receiving the one or more signals using a set of multiple receiver circles of the first device based on the monitoring, the set of multiple receiver circles corresponding to the set of multiple orbital angular momentum modes. In some examples, the signal strength determination component 980 may be configured as or otherwise support a means for determining the one or more signal strength measurements for the one or more signals based on receiving the one or more signals. In some examples, the OAM mode selection component 985 may be configured as or otherwise support a means for selecting the one or more orbital angular momentum modes of the set of multiple orbital angular momentum modes based on determining the one or more signal strength measurements.

In some examples, to support transmitting the feedback message, the feedback transmitter 950 may be configured as or otherwise support a means for transmitting a total signal strength for the selected one or more orbital angular momentum modes in the feedback message.

In some examples, the OAM signal receiver 975 may be configured as or otherwise support a means for receiving the one or more signals using a set of multiple receiver circles of the first device based on the monitoring, the set of multiple receiver circles corresponding to the set of multiple orbital angular momentum modes. In some examples, the signal strength determination component 980 may be configured as or otherwise support a means for determining a respective signal strength measurement for each of the set of multiple orbital angular momentum modes based on receiving the one or more signals. In some examples, the feedback transmitter 950 may be configured as or otherwise support a means for transmitting the respective signal strengths for each of the set of multiple orbital angular momentum modes in the feedback message.

Figure 10:
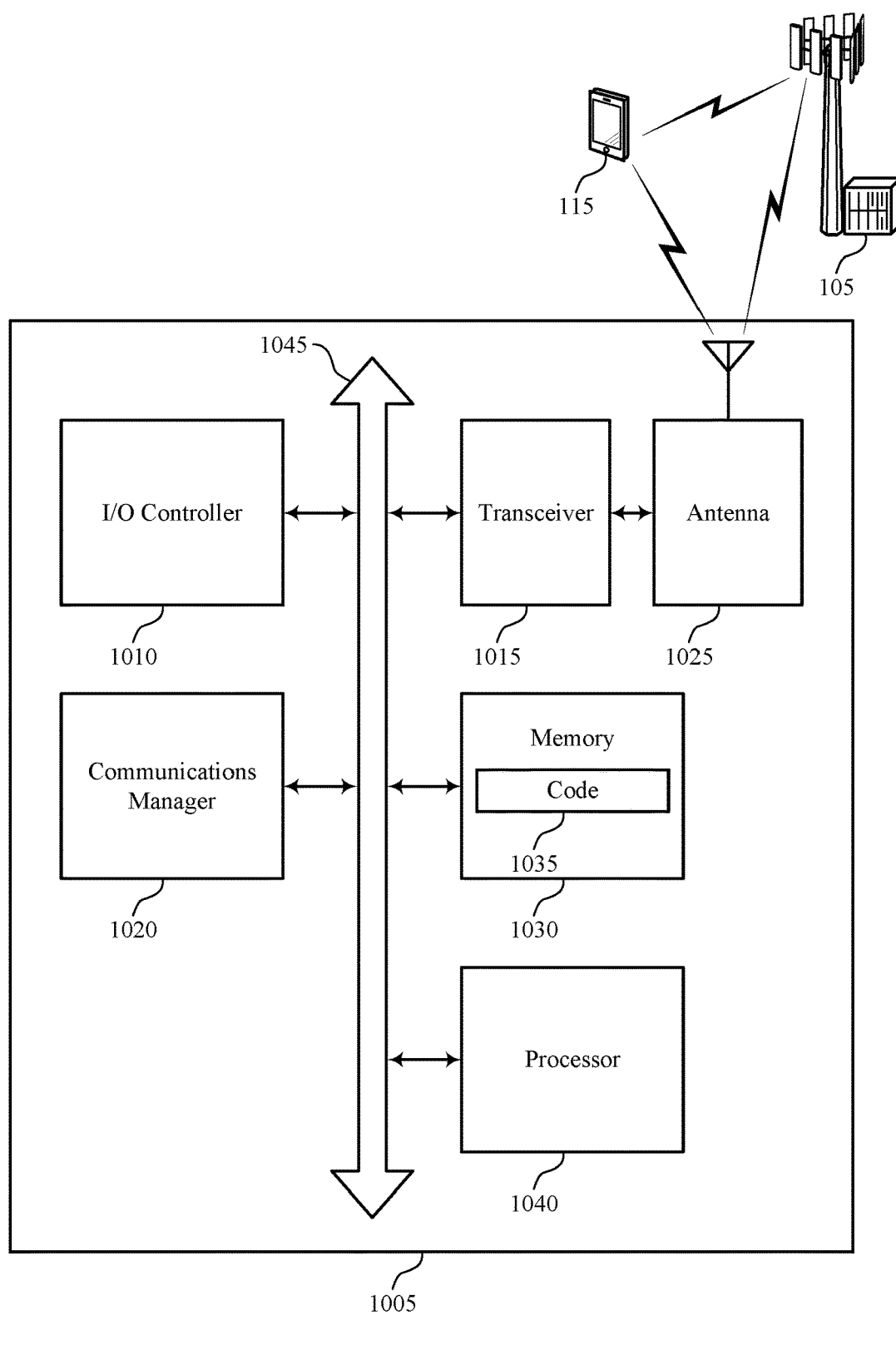
FIG. 10 shows a diagram of a system including a UE that supports transmit diversity across orbital angular momentum modes in accordance with aspects of the present disclosure.

FIG. 10 shows a diagram of a system 1000 including a device 1005 that supports transmit diversity across orbital angular momentum modes in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting transmit diversity across orbital angular momentum modes). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a first device in accordance with examples as disclosed herein. For example, the communications manager 1020 may be configured as or otherwise support a means for selecting, from a set of multiple orbital angular momentum modes, a subset of orbital angular momentum modes for a transmit diversity scheme associated with communications between the first device and a second device, the subset including a first orbital angular momentum mode of the set of multiple orbital angular momentum modes and a second orbital angular momentum mode of the set of multiple orbital angular momentum modes. The communications manager 1020 may be configured as or otherwise support a means for transmitting, to the second device, an indication of the transmit diversity scheme associated with communications between the first device and the second device, the transmit diversity scheme indicating the subset of orbital angular momentum modes. The communications manager 1020 may be configured as or otherwise support a means for transmitting, based on the transmit diversity scheme, a data packet to the second device using a set of transmitter circles of the first device, the set of transmitter circles corresponding to both the first orbital angular momentum mode and the second orbital angular momentum mode.

Additionally or alternatively, the communications manager 1020 may support wireless communications at a first device in accordance with examples as disclosed herein. For example, the communications manager 1020 may be configured as or otherwise support a means for receiving, from a second device, an indication of the transmit diversity scheme associated with communications between the first device and the second device, the transmit diversity scheme indicating a set of multiple orbital angular momentum modes for one or more signals from the first device. The communications manager 1020 may be configured as or otherwise support a means for monitoring for the one or more signals from the first device based on the transmit diversity scheme. The communications manager 1020 may be configured as or otherwise support a means for transmitting a feedback message to the second device based on the monitoring, the feedback message indicating one or more signal strength measurements for one or more orbital angular momentum modes of the set of multiple orbital angular momentum modes, the one or more signal strength measurements associated with the one or more signals.

By including or configuring the communications manager 1020 in accordance with examples as described herein, the device 1005 may support techniques for more efficient utilization of communication resources, improved throughput, and higher likelihood of decoding success by using multiple OAM modes for communicating a single data packet or data stream. Such techniques may increase communication efficiency, which may reduce power consumption and increase battery life.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of transmit diversity across orbital angular momentum modes as described herein, or the processor 1040 and the memory 1030 may be otherwise configured to perform or support such operations.

Figure 11:
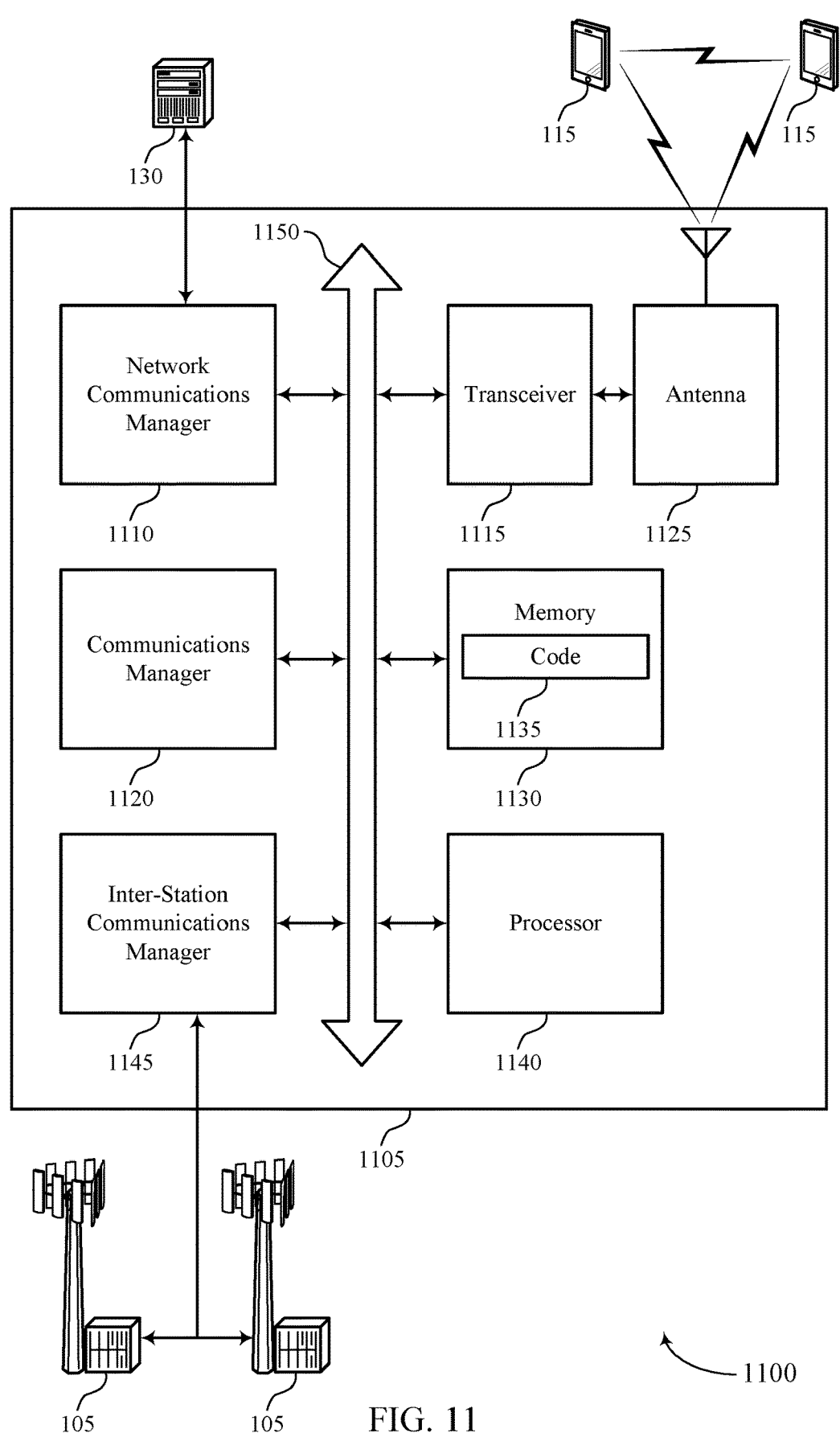
FIG. 11 shows a diagram of a system including a base station that supports transmit diversity across orbital angular momentum modes in accordance with aspects of the present disclosure.

FIG. 11 shows a diagram of a system 1100 including a device 1105 that supports transmit diversity across orbital angular momentum modes in accordance with aspects of the present disclosure. The device 1105 may be an example of or include the components of a device 705, a device 805, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter

715, a transmitter 815, a receiver 710, a receiver 810, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting transmit diversity across orbital angular momentum modes). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communications at a first device in accordance with examples as disclosed herein. For example, the communications manager 1120 may be configured as or otherwise support a means for selecting, from a set of multiple orbital angular momentum modes, a subset of orbital angular momentum modes for a transmit diversity scheme associated with communications between the first device and a second device, the subset including a first orbital angular momentum mode of the set of multiple orbital angular momentum modes and a second orbital angular momentum mode of the set of multiple orbital angular momentum modes. The communications manager 1120 may be configured as or otherwise support a means for transmitting, to the second device, an indication of the transmit diversity scheme associated with communications between the first device and the second device, the transmit diversity scheme indicating the subset of orbital angular momentum modes. The communications manager 1120 may be configured as or otherwise support a means for transmitting, based on the transmit diversity scheme, a data packet to the second device using a set of transmitter circles of the first device, the set of transmitter circles corresponding to both the first orbital angular momentum mode and the second orbital angular momentum mode.

Additionally or alternatively, the communications manager 1120 may support wireless communications at a first device in accordance with examples as disclosed herein. For example, the communications manager 1120 may be configured as or otherwise support a means for receiving, from a second device, an indication of the transmit diversity scheme associated with communications between the first device and the second device, the transmit diversity scheme indicating a set of multiple orbital angular momentum modes for one or more signals from the first device. The communications manager 1120 may be configured as or otherwise support a means for monitoring for the one or more signals from the first device based on the transmit diversity scheme. The communications manager 1120 may be configured as or otherwise support a means for transmitting a feedback message to the second device based on the monitoring, the feedback message indicating one or more signal strength measurements for one or more orbital angular momentum modes of the set of multiple orbital angular momentum modes, the one or more signal strength measurements associated with the one or more signals.

By including or configuring the communications manager 1120 in accordance with examples as described herein, the device 1105 may support techniques for techniques for more efficient utilization of communication resources, improved throughput, and higher likelihood of decoding success by using multiple OAM modes for communicating a single data packet or data stream. Such techniques may increase communication efficiency, which may reduce power consumption and increase battery life.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of transmit diversity across orbital angular momentum modes as described herein, or the processor 1140 and the memory 1130 may be otherwise configured to perform or support such operations.

FIG. 12 shows a flowchart illustrating a method 1200 that supports transmit diversity across orbital angular momentum modes in accordance with aspects of the present disclosure. The operations of the method 1200 may be implemented by a UE or a base station or its components as described herein. For example, the operations of the method 1200 may be performed by a UE 115 or a base station 105 as described with reference to FIGS. 1 through 11. In some examples, a UE or a base station may execute a set of instructions to control the functional elements of the UE or the base station to perform the described functions. Additionally or alternatively, the UE or the base station may perform aspects of the described functions using special-purpose hardware.

At 1205, the method may include selecting, from a set of multiple orbital angular momentum modes, a subset of orbital angular momentum modes for a transmit diversity scheme associated with communications between the first device and a second device, the subset including a first orbital angular momentum mode of the set of multiple orbital angular momentum modes and a second orbital angular momentum mode of the set of multiple orbital angular momentum modes. The operations of 1205 may be performed in accordance with examples as disclosed herein. In some examples, aspects of the operations of 1205 may be performed by a OAM mode selector 925 as described with reference to FIG. 9.

At 1210, the method may include transmitting, to the second device, an indication of the transmit diversity scheme associated with communications between the first device and the second device, the transmit diversity scheme indicating the subset of orbital angular momentum modes. The operations of 1210 may be performed in accordance with examples as disclosed herein. In some examples, aspects of the operations of 1210 may be performed by a diversity scheme transmitter 930 as described with reference to FIG. 9.

At 1215, the method may include transmitting, based on the transmit diversity scheme, a data packet to the second device using a set of transmitter circles of the first device, the set of transmitter circles corresponding to both the first orbital angular momentum mode and the second orbital angular momentum mode. The operations of 1215 may be performed in accordance with examples as disclosed herein. In some examples, aspects of the operations of 1215 may be performed by a OAM data packet transmitter 935 as described with reference to FIG. 9.

FIG. 13 shows a flowchart illustrating a method 1300 that supports transmit diversity across orbital angular momentum modes in accordance with aspects of the present disclosure. The operations of the method 1300 may be implemented by a UE or a base station or its components as described herein. For example, the operations of the method 1300 may be performed by a UE 115 or a base station 105 as described with reference to FIGS. 1 through 11. In some examples, a UE or a base station may execute a set of instructions to control the functional elements of the UE or the base station to perform the described functions. Additionally or alternatively, the UE or the base station may perform aspects of the described functions using special-purpose hardware.

At 1305, the method may include receiving, from a second device, a feedback message for a data packet (e.g., a previously transmitted data packet, a data packet to be transmitted), the feedback message indicating a signal strength of the data packet and one or more orbital angular momentum modes for the transmit diversity scheme. The operations of 1305 may be performed in accordance with examples as disclosed herein. In some examples, aspects of the operations of 1305 may be performed by a feedback receiver 955 as described with reference to FIG. 9.

At 1310, the method may include selecting, from a set of multiple orbital angular momentum modes, a subset of orbital angular momentum modes for a transmit diversity scheme associated with communications between the first device and the second device, the subset including a first orbital angular momentum mode of the set of multiple orbital angular momentum modes and a second orbital angular momentum mode of the set of multiple orbital angular momentum modes. The operations of 1310 may be performed in accordance with examples as disclosed herein. In some examples, aspects of the operations of 1310 may be performed by a OAM mode selector 925 as described with reference to FIG. 9.

At 1315, the method may include transmitting, to the second device, an indication of the transmit diversity scheme associated with communications between the first device and the second device, the transmit diversity scheme indicating the subset of orbital angular momentum modes. The operations of 1315 may be performed in accordance with examples as disclosed herein. In some examples, aspects of the operations of 1315 may be performed by a diversity scheme transmitter 930 as described with reference to FIG. 9.

At 1320, the method may include transmitting, based on the transmit diversity scheme, a data packet (e.g., the data packet associated with receiving the feedback message or a different data packet) to the second device using a set of transmitter circles of the first device, the set of transmitter circles corresponding to both the first orbital angular momentum mode and the second orbital angular momentum mode. The operations of 1320 may be performed in accordance with examples as disclosed herein. In some examples, aspects of the operations of 1320 may be performed by a OAM data packet transmitter 935 as described with reference to FIG. 9.

The aspects of the method may be performed in any order. For example, the method may include receiving the feedback message at 1305 after transmitting the data packet to the second device at 1320.

Figure 14:
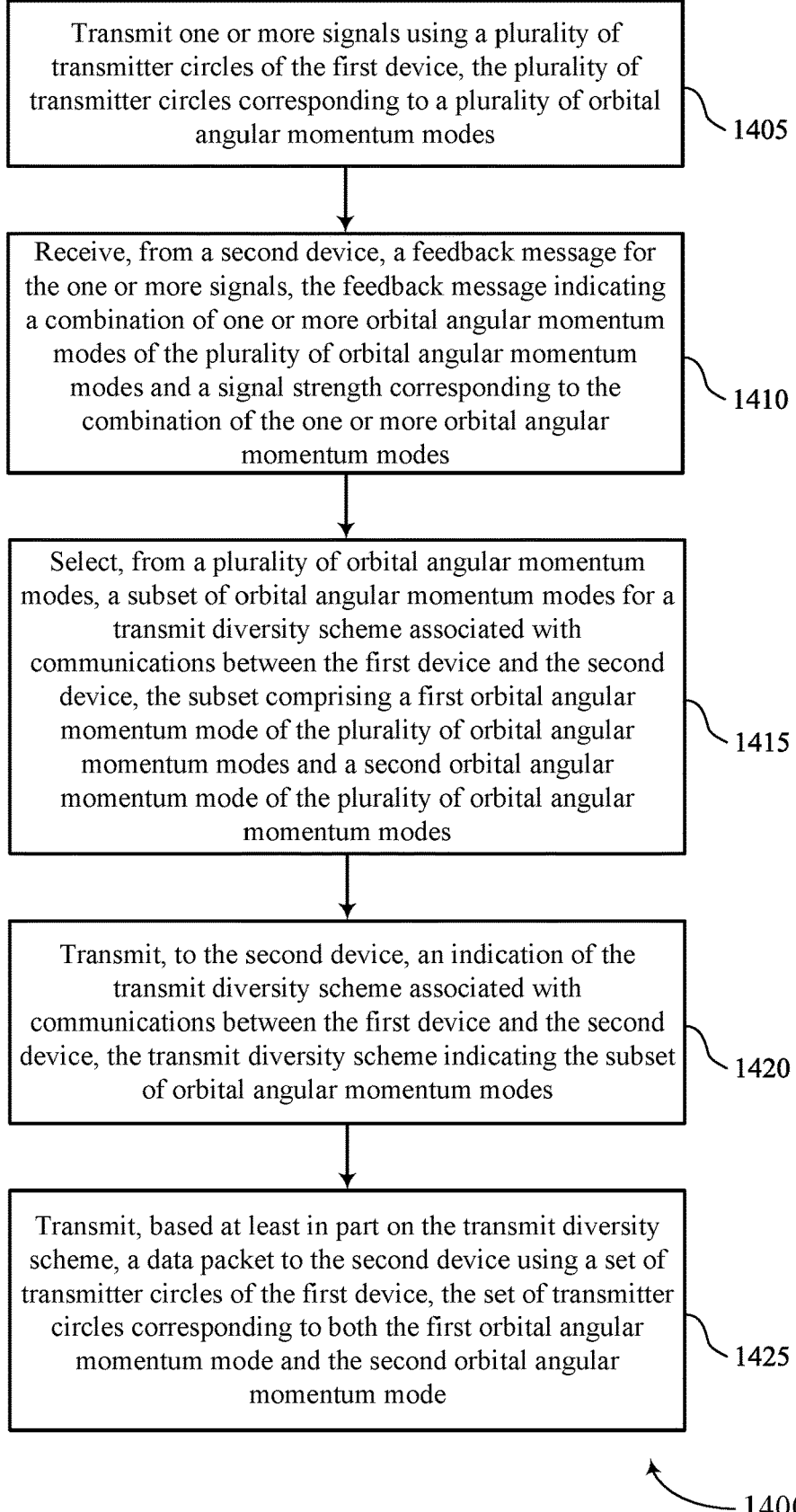

FIG. 14 shows a flowchart illustrating a method 1400 that supports transmit diversity across orbital angular momentum modes in accordance with aspects of the present disclosure. The operations of the method 1400 may be implemented by a UE or a base station or its components as described herein. For example, the operations of the method 1400 may be performed by a UE 115 or a base station 105 as described with reference to FIGS. 1 through 11. In some examples, a UE or a base station may execute a set of instructions to control the functional elements of the UE or the base station to perform the described functions. Additionally or alternatively, the UE or the base station may perform aspects of the described functions using special-purpose hardware.

At 1405, the method may include transmitting one or more signals using a set of multiple transmitter circles of the first device, the set of multiple transmitter circles corresponding to a set of multiple orbital angular momentum modes. The operations of 1405 may be performed in accordance with examples as disclosed herein. In some examples, aspects of the operations of 1405 may be performed by a OAM signal transmitter 965 as described with reference to FIG. 9.

At 1410, the method may include receiving, from a second device, a feedback message for the one or more signals, the feedback message indicating a combination of one or more orbital angular momentum modes of the set of multiple orbital angular momentum modes and a signal strength corresponding to the combination of the one or more orbital angular momentum modes. The operations of 1410 may be performed in accordance with examples as disclosed herein. In some examples, aspects of the operations of 1410 may be performed by a feedback receiver 955 as described with reference to FIG. 9.

At 1415, the method may include selecting, from a set of multiple orbital angular momentum modes, a subset of orbital angular momentum modes for a transmit diversity scheme associated with communications between the first device and the second device, the subset including a first orbital angular momentum mode of the set of multiple orbital angular momentum modes and a second orbital angular momentum mode of the set of multiple orbital angular momentum modes. The operations of 1415 may be performed in accordance with examples as disclosed herein. In some examples, aspects of the operations of 1415 may be performed by a OAM mode selector 925 as described with reference to FIG. 9.

At 1420, the method may include transmitting, to the second device, an indication of the transmit diversity scheme associated with communications between the first device and the second device, the transmit diversity scheme indicating the subset of orbital angular momentum modes. The operations of 1420 may be performed in accordance with examples as disclosed herein. In some examples, aspects of the operations of 1420 may be performed by a diversity scheme transmitter 930 as described with reference to FIG. 9.

At 1425, the method may include transmitting, based on the transmit diversity scheme, a data packet to the second device using a set of transmitter circles of the first device, the set of transmitter circles corresponding to both the first orbital angular momentum mode and the second orbital angular momentum mode. The operations of 1425 may be performed in accordance with examples as disclosed herein. In some examples, aspects of the operations of 1425 may be performed by a OAM data packet transmitter 935 as described with reference to FIG. 9.

The aspects of the method may be performed in any order. For example, the method may include transmitting the one or more signals at 1405 and receiving the feedback message at 1410 after transmitting the data packet at 1425.

FIG. 15 shows a flowchart illustrating a method 1500 that supports transmit diversity across orbital angular momentum modes in accordance with aspects of the present disclosure. The operations of the method 1500 may be implemented by a UE or a base station or its components as described herein. For example, the operations of the method 1500 may be performed by a UE 115 or a base station 105 as described with reference to FIGS. 1 through 11. In some examples, a UE or a base station may execute a set of instructions to control the functional elements of the UE or the base station to perform the described functions. Additionally or alternatively, the UE or the base station may perform aspects of the described functions using special-purpose hardware.

At 1505, the method may include selecting, from a set of multiple orbital angular momentum modes, a subset of orbital angular momentum modes for a transmit diversity scheme associated with communications between the first device and a second device, the subset including a first orbital angular momentum mode of the set of multiple orbital angular momentum modes and a second orbital angular momentum mode of the set of multiple orbital angular momentum modes. The operations of 1505 may be performed in accordance with examples as disclosed herein. In some examples, aspects of the operations of 1505 may be performed by a OAM mode selector 925 as described with reference to FIG. 9.

At 1510, the method may include transmitting, to the second device, an indication of the transmit diversity scheme associated with communications between the first device and the second device, the transmit diversity scheme indicating the subset of orbital angular momentum modes. The operations of 1510 may be performed in accordance with examples as disclosed herein. In some examples, aspects of the operations of 1510 may be performed by a diversity scheme transmitter 930 as described with reference to FIG. 9.

At 1515, the method may include transmitting, based on the transmit diversity scheme, a data packet to the second device using a set of transmitter circles of the first device, the set of transmitter circles corresponding to both the first orbital angular momentum mode and the second orbital angular momentum mode. The operations of 1515 may be performed in accordance with examples as disclosed herein. In some examples, aspects of the operations of 1515 may be performed by a OAM data packet transmitter 935 as described with reference to FIG. 9.

At 1520, the method may include transmitting one or more signals using a set of multiple transmitter circles of the first device, the set of multiple transmitter circles corresponding to the set of multiple orbital angular momentum modes. The operations of 1520 may be performed in accordance with examples as disclosed herein. In some examples, aspects of the operations of 1520 may be performed by a OAM signal transmitter 965 as described with reference to FIG. 9.

At 1525, the method may include receiving, from the second device, a feedback message for the one or more signals, the feedback message indicating a respective signal strength for each of the set of multiple orbital angular momentum modes. The operations of 1525 may be performed in accordance with examples as disclosed herein. In some examples, aspects of the operations of 1525 may be performed by a feedback receiver 955 as described with reference to FIG. 9.

FIG. 16 shows a flowchart illustrating a method 1600 that supports transmit diversity across orbital angular momentum modes in accordance with aspects of the present disclosure. The operations of the method 1600 may be implemented by a UE or a base station or its components as described herein. For example, the operations of the method 1600 may be performed by a UE 115 or a base station 105 as described with reference to FIGS. 1 through 11. In some examples, a UE or a base station may execute a set of instructions to control the functional elements of the UE or the base station to perform the described functions. Additionally or alternatively, the UE or the base station may perform aspects of the described functions using special-purpose hardware.

At 1605, the method may include receiving, from a second device, an indication of the transmit diversity scheme associated with communications between the first device and the second device, the transmit diversity scheme indicating a set of multiple orbital angular momentum modes for one or more signals from the first device. The operations of 1605 may be performed in accordance with examples as disclosed herein. In some examples, aspects of the operations of 1605 may be performed by a diversity scheme receiver 940 as described with reference to FIG. 9.

At 1610, the method may include monitoring for the one or more signals from the first device based on the transmit diversity scheme. The operations of 1610 may be performed in accordance with examples as disclosed herein. In some examples, aspects of the operations of 1610 may be performed by a signal monitoring component 945 as described with reference to FIG. 9.

At 1615, the method may include transmitting a feedback message to the second device based on the monitoring, the feedback message indicating one or more signal strength measurements for one or more orbital angular momentum modes of the set of multiple orbital angular momentum modes, the one or more signal strength measurements associated with the one or more signals. The operations of 1615 may be performed in accordance with examples as disclosed herein. In some examples, aspects of the operations of 1615 may be performed by a feedback transmitter 950 as described with reference to FIG. 9.

FIG. 17 shows a flowchart illustrating a method 1700 that supports transmit diversity across orbital angular momentum modes in accordance with aspects of the present disclosure. The operations of the method 1700 may be implemented by a UE or a base station or its components as described herein. For example, the operations of the method 1700 may be performed by a UE 115 or a base station 105 as described with reference to FIGS. 1 through 11. In some examples, a UE or a base station may execute a set of instructions to control the functional elements of the UE or the base station to perform the described functions. Additionally or alternatively, the UE or the base station may perform aspects of the described functions using special-purpose hardware.

At 1705, the method may include receiving, from a second device, an indication of the transmit diversity scheme associated with communications between the first device and the second device, the transmit diversity scheme indicating a set of multiple orbital angular momentum modes for one or more signals from the first device. The operations of 1705 may be performed in accordance with examples as disclosed herein. In some examples, aspects of the operations of 1705 may be performed by a diversity scheme receiver 940 as described with reference to FIG. 9.

At 1710, the method may include monitoring for the one or more signals from the first device based on the transmit diversity scheme. The operations of 1710 may be performed in accordance with examples as disclosed herein. In some examples, aspects of the operations of 1710 may be performed by a signal monitoring component 945 as described with reference to FIG. 9.

At 1715, the method may include transmitting a feedback message to the second device based on the monitoring, the feedback message indicating one or more signal strength measurements for one or more orbital angular momentum modes of the set of multiple orbital angular momentum modes, the one or more signal strength measurements associated with the one or more signals. The operations of 1715 may be performed in accordance with examples as disclosed herein. In some examples, aspects of the operations of 1715 may be performed by a feedback transmitter 950 as described with reference to FIG. 9.

At 1720, the method may include transmitting a total signal strength of the one or more signals for a combination of multiple orbital angular momentum modes of the set of multiple orbital angular momentum modes. The operations of 1720 may be performed in accordance with examples as disclosed herein. In some examples, aspects of the operations of 1720 may be performed by a feedback transmitter 950 as described with reference to FIG. 9.

FIG. 18 shows a flowchart illustrating a method 1800 that supports transmit diversity across orbital angular momentum modes in accordance with aspects of the present disclosure. The operations of the method 1800 may be implemented by a UE or a base station or its components as described herein. For example, the operations of the method 1800 may be performed by a UE 115 or a base station 105 as described with reference to FIGS. 1 through 11. In some examples, a UE or a base station may execute a set of instructions to control the functional elements of the UE or the base station to perform the described functions. Additionally or alternatively, the UE or the base station may perform aspects of the described functions using special-purpose hardware.

At 1805, the method may include receiving, from a second device, an indication of the transmit diversity scheme associated with communications between the first device and the second device, the transmit diversity scheme indicating a set of multiple orbital angular momentum modes for one or more signals from the first device. The operations of 1805 may be performed in accordance with examples as disclosed herein. In some examples, aspects of the operations of 1805 may be performed by a diversity scheme receiver 940 as described with reference to FIG. 9.

At 1810, the method may include monitoring for the one or more signals from the first device based on the transmit diversity scheme. The operations of 1810 may be performed in accordance with examples as disclosed herein. In some examples, aspects of the operations of 1810 may be performed by a signal monitoring component 945 as described with reference to FIG. 9.

At 1815, the method may include receiving the one or more signals using a set of multiple receiver circles of the first device based on the monitoring, the set of multiple receiver circles corresponding to the set of multiple orbital angular momentum modes. The operations of 1815 may be performed in accordance with examples as disclosed herein. In some examples, aspects of the operations of 1815 may be performed by a OAM signal receiver 975 as described with reference to FIG. 9.

At 1820, the method may include determining the one or more signal strength measurements for the one or more signals based on receiving the one or more signals. The operations of 1820 may be performed in accordance with examples as disclosed herein. In some examples, aspects of the operations of 1820 may be performed by a signal strength determination component 980 as described with reference to FIG. 9.

At 1825, the method may include selecting the one or more orbital angular momentum modes of the set of multiple orbital angular momentum modes based on determining the one or more signal strength measurements. The operations of 1825 may be performed in accordance with examples as disclosed herein. In some examples, aspects of the operations of 1825 may be performed by a OAM mode selection component 985 as described with reference to FIG. 9.

At 1830, the method may include transmitting a feedback message to the second device based on the monitoring, the feedback message indicating one or more signal strength measurements for one or more orbital angular momentum modes of the set of multiple orbital angular momentum modes, the one or more signal strength measurements associated with the one or more signals. The operations of 1830 may be performed in accordance with examples as disclosed herein. In some examples, aspects of the operations of 1830 may be performed by a feedback transmitter 950 as described with reference to FIG. 9.

FIG. 19 shows a flowchart illustrating a method 1900 that supports transmit diversity across orbital angular momentum modes in accordance with aspects of the present disclosure. The operations of the method 1900 may be implemented by a UE or a base station or its components as described herein. For example, the operations of the method 1900 may be performed by a UE 115 or a base station 105 as described with reference to FIGS. 1 through 11. In some examples, a UE or a base station may execute a set of instructions to control the functional elements of the UE or the base station to perform the described functions. Additionally or alternatively, the UE or the base station may perform aspects of the described functions using special-purpose hardware.

At 1905, the method may include receiving, from a second device, an indication of the transmit diversity scheme associated with communications between the first device and the second device, the transmit diversity scheme indicating a set of multiple orbital angular momentum modes for one or more signals from the first device. The operations of 1905 may be performed in accordance with examples as disclosed herein. In some examples, aspects of the operations of 1905 may be performed by a diversity scheme receiver 940 as described with reference to FIG. 9.

At 1910, the method may include monitoring for the one or more signals from the first device based on the transmit diversity scheme. The operations of 1910 may be performed in accordance with examples as disclosed herein. In some examples, aspects of the operations of 1910 may be performed by a signal monitoring component 945 as described with reference to FIG. 9.

At 1915, the method may include receiving the one or more signals using a set of multiple receiver circles of the first device based on the monitoring, the set of multiple receiver circles corresponding to the set of multiple orbital angular momentum modes. The operations of 1915 may be performed in accordance with examples as disclosed herein. In some examples, aspects of the operations of 1915 may be performed by a OAM signal receiver 975 as described with reference to FIG. 9.

At 1920, the method may include determining a respective signal strength measurement for each of the set of multiple orbital angular momentum modes based on receiving the one or more signals. The operations of 1920 may be performed in accordance with examples as disclosed herein. In some examples, aspects of the operations of 1920 may be performed by a signal strength determination component 980 as described with reference to FIG. 9.

At 1925, the method may include transmitting a feedback message to the second device based on the monitoring, the feedback message indicating one or more signal strength measurements for one or more orbital angular momentum modes of the set of multiple orbital angular momentum modes, the one or more signal strength measurements associated with the one or more signals. The operations of 1925 may be performed in accordance with examples as disclosed herein. In some examples, aspects of the operations of 1925 may be performed by a feedback transmitter 950 as described with reference to FIG. 9.

At 1930, the method may include transmitting the respective signal strengths for each of the set of multiple orbital angular momentum modes in the feedback message. The operations of 1930 may be performed in accordance with examples as disclosed herein. In some examples, aspects of the operations of 1930 may be performed by a feedback transmitter 950 as described with reference to FIG. 9.

The following provides an overview of aspects of the present disclosure:

Aspect 1: A method for wireless communications at a first device, comprising: selecting, from a plurality of orbital angular momentum modes, a subset of orbital angular momentum modes for a transmit diversity scheme associated with communications between the first device and a second device, the subset comprising a first orbital angular momentum mode of the plurality of orbital angular momentum modes and a second orbital angular momentum mode of the plurality of orbital angular momentum modes; transmitting, to the second device, an indication of the transmit diversity scheme associated with communications between the first device and the second device, the transmit diversity scheme indicating the subset of orbital angular momentum modes; and transmitting, based at least in part on the transmit diversity scheme, a data packet to the second device using a set of transmitter circles of the first device, the set of transmitter circles corresponding to both the first orbital angular momentum mode and the second orbital angular momentum mode.

Aspect 2: The method of aspect 1, further comprising: receiving, from the second device, a feedback message for the data packet, the feedback message indicating a signal strength of the data packet and one or more orbital angular momentum modes for the transmit diversity scheme.

Aspect 3: The method of any of aspects 1 through 2, further comprising: transmitting a control message corresponding to the data packet, the control message instructing the second device to provide feedback for the data packet based at least in part on the first orbital angular momentum mode and the second orbital angular momentum mode.

Aspect 4: The method of aspect 3, further comprising: receiving, from the second device, a feedback message for the data packet, the feedback message indicating a signal strength of the data packet for a combination of the first orbital angular momentum mode and the second orbital angular momentum mode.

Aspect 5: The method of any of aspects 1 through 4, further comprising: transmitting a control message corresponding to the data packet, the control message indicating the transmit diversity scheme for transmission of the data packet.

Aspect 6: The method of any of aspects 1 through 5, further comprising: transmitting one or more signals using a plurality of transmitter circles of the first device, the plurality of transmitter circles corresponding to the plurality of orbital angular momentum modes; and receiving, from the second device, a feedback message for the one or more signals, the feedback message indicating a combination of one or more orbital angular momentum modes of the plurality of orbital angular momentum modes and a signal strength corresponding to the combination of the one or more orbital angular momentum modes.

Aspect 7: The method of aspect 6, wherein selecting the subset of orbital angular momentum modes comprises: selecting the subset of orbital angular momentum modes based at least in part on the feedback message, wherein the subset comprises the combination of the one or more orbital angular momentum modes.

Aspect 8: The method of any of aspects 6 through 7, wherein the feedback message indicates which of the plurality of orbital angular momentum modes are combined by the second device.

Aspect 9: The method of any of aspects 1 through 8, further comprising: transmitting one or more signals using a plurality of transmitter circles of the first device, the plurality of transmitter circles corresponding to the plurality of orbital angular momentum modes; and receiving, from the second device, a feedback message for the one or more signals, the feedback message indicating a respective signal strength for each of the plurality of orbital angular momentum modes.

Aspect 10: The method of aspect 9, wherein selecting the subset of orbital angular momentum modes comprises: selecting the subset of orbital angular momentum modes based at least in part on the respective signal strengths for each of the plurality of orbital angular momentum modes.

Aspect 11: A method for wireless communications at a first device, comprising: receiving, from a second device, an indication of the transmit diversity scheme associated with communications between the first device and the second device, the transmit diversity scheme indicating a plurality of orbital angular momentum modes for one or more signals from the first device; monitoring for the one or more signals from the first device based at least in part on the transmit diversity scheme; and transmitting a feedback message to the second device based at least in part on the monitoring, the feedback message indicating one or more signal strength measurements for one or more orbital angular momentum modes of the plurality of orbital angular momentum modes, the one or more signal strength measurements associated with the one or more signals.

Aspect 12: The method of aspect 11, wherein transmitting the feedback message comprises: transmitting a total signal strength of the one or more signals for a combination of multiple orbital angular momentum modes of the plurality of orbital angular momentum modes.

Aspect 13: The method of any of aspects 11 through 12, further comprising: receiving a control message for a data packet, the control message instructing the second device to provide feedback for the data packet based at least in part on a combination of a first orbital angular momentum mode and a second orbital angular momentum mode of the plurality of orbital angular momentum modes, wherein the one or more signal strength measurements for the one or more orbital angular momentum modes correspond to the combination of the first orbital angular momentum mode and the second orbital angular momentum mode.

Aspect 14: The method of aspect 13, wherein the control message comprises the indication of the transmit diversity scheme.

Aspect 15: The method of any of aspects 11 through 14, further comprising: receiving a control message for a data packet, the control message comprising the indication of the transmit diversity scheme.

Aspect 16: The method of any of aspects 11 through 15, further comprising: receiving the one or more signals using a plurality of receiver circles of the first device based at least in part on the monitoring, the plurality of receiver circles corresponding to the plurality of orbital angular momentum modes; determining the one or more signal strength measurements for the one or more signals based at least in part on receiving the one or more signals; and selecting the one or more orbital angular momentum modes of the plurality of orbital angular momentum modes based at least in part on determining the one or more signal strength measurements.

Aspect 17: The method of aspect 16, wherein transmitting the feedback message comprises: transmitting a total signal strength for the selected one or more orbital angular momentum modes in the feedback message.

Aspect 18: The method of any of aspects 11 through 17, further comprising: receiving the one or more signals using a plurality of receiver circles of the first device based at least in part on the monitoring, the plurality of receiver circles corresponding to the plurality of orbital angular momentum modes; determining a respective signal strength measurement for each of the plurality of orbital angular momentum modes based at least in part on receiving the one or more signals; and transmitting the respective signal strengths for each of the plurality of orbital angular momentum modes in the feedback message.

Aspect 19: An apparatus for wireless communications at a first device, comprising a processor; memory coupled with the processor; and instructions stored in the memory and executable by the processor to cause the apparatus to perform a method of any of aspects 1 through 10.

Aspect 20: An apparatus for wireless communications at a first device, comprising at least one means for performing a method of any of aspects 1 through 10.

Aspect 21: A non-transitory computer-readable medium storing code for wireless communications at a first device, the code comprising instructions executable by a processor to perform a method of any of aspects 1 through 10.

Aspect 22: An apparatus for wireless communications at a first device, comprising a processor; memory coupled with the processor; and instructions stored in the memory and executable by the processor to cause the apparatus to perform a method of any of aspects 11 through 18.

Aspect 23: An apparatus for wireless communications at a first device, comprising at least one means for performing a method of any of aspects 11 through 18.

Aspect 24: A non-transitory computer-readable medium storing code for wireless communications at a first device, the code comprising instructions executable by a processor to perform a method of any of aspects 11 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first device, comprising:

selecting, from a plurality of orbital angular momentum modes, a subset of orbital angular momentum modes for a transmit diversity scheme associated with communications between the first device and a second device, the subset comprising a first orbital angular momentum mode of the plurality of orbital angular momentum modes and a second orbital angular momentum mode of the plurality of orbital angular momentum modes;

transmitting, to the second device, an indication of the transmit diversity scheme associated with communications between the first device and the second device, the transmit diversity scheme indicating the subset of orbital angular momentum modes; and transmitting, based at least in part on the transmit diversity scheme, a data packet to the second device using a set of transmitter circles of the first device, the set of transmitter circles corresponding to both the first orbital angular momentum mode and the second orbital angular momentum mode.

2. The method of claim 1, further comprising:

receiving, from the second device, a feedback message for the data packet, the feedback message indicating a signal strength of the data packet and one or more orbital angular momentum modes for the transmit diversity scheme.

3. The method of claim 1, further comprising:

transmitting a control message corresponding to the data packet, the control message instructing the second device to provide feedback for the data packet based at least in part on the first orbital angular momentum mode and the second orbital angular momentum mode.

4. The method of claim 3, further comprising:

receiving, from the second device, a feedback message for the data packet, the feedback message indicating a signal strength of the data packet for a combination of the first orbital angular momentum mode and the second orbital angular momentum mode.

5. The method of claim 1, further comprising:

transmitting a control message corresponding to the data packet, the control message indicating the transmit diversity scheme for transmission of the data packet.

6. The method of claim 1, further comprising:

transmitting one or more signals using a plurality of transmitter circles of the first device, the plurality of transmitter circles corresponding to the plurality of orbital angular momentum modes; and receiving, from the second device, a feedback message for the one or more signals, the feedback message indicating a combination of one or more orbital angular momentum modes of the plurality of orbital angular momentum modes and a signal strength corresponding to the combination of the one or more orbital angular momentum modes.

7. The method of claim 6, wherein selecting the subset of orbital angular momentum modes comprises:

selecting the subset of orbital angular momentum modes based at least in part on the feedback message, wherein the subset comprises the combination of the one or more orbital angular momentum modes.

8. The method of claim 6, wherein the feedback message indicates which of the plurality of orbital angular momentum modes are combined by the second device.

9. The method of claim 1, further comprising:

transmitting one or more signals using a plurality of transmitter circles of the first device, the plurality of transmitter circles corresponding to the plurality of orbital angular momentum modes; and receiving, from the second device, a feedback message for the one or more signals, the feedback message indicating a respective signal strength for each of the plurality of orbital angular momentum modes.

10. The method of claim 9, wherein selecting the subset of orbital angular momentum modes comprises:

selecting the subset of orbital angular momentum modes based at least in part on the respective signal strengths for each of the plurality of orbital angular momentum modes.

11. A method for wireless communications at a first device, comprising:

receiving, from a second device, an indication of the transmit diversity scheme associated with communications between the first device and the second device, the transmit diversity scheme indicating a plurality of orbital angular momentum modes for one or more signals from the first device;

monitoring for the one or more signals from the first device based at least in part on the transmit diversity scheme; and transmitting a feedback message to the second device based at least in part on the monitoring, the feedback message indicating one or more signal strength measurements for one or more orbital angular momentum modes of the plurality of orbital angular momentum modes, the one or more signal strength measurements associated with the one or more signals.

12. The method of claim 11, wherein transmitting the feedback message comprises:

transmitting a total signal strength of the one or more signals for a combination of multiple orbital angular momentum modes of the plurality of orbital angular momentum modes.

13. The method of claim 11, further comprising:

receiving a control message for a data packet, the control message instructing the second device to provide feedback for the data packet based at least in part on a combination of a first orbital angular momentum mode and a second orbital angular momentum mode of the plurality of orbital angular momentum modes, wherein the one or more signal strength measurements for the one or more orbital angular momentum modes corre- spond to the combination of the first orbital angular momentum mode and the second orbital angular momentum mode.

14. The method of claim 13, wherein the control message comprises the indication of the transmit diversity scheme.

15. The method of claim 11, further comprising:
receiving a control message for a data packet, the control message comprising the indication of the transmit diversity scheme.

16. The method of claim 11, further comprising:
receiving the one or more signals using a plurality of receiver circles of the first device based at least in part on the monitoring, the plurality of receiver circles corresponding to the plurality of orbital angular momentum modes;
determining the one or more signal strength measure- ments for the one or more signals based at least in part on receiving the one or more signals; and
selecting the one or more orbital angular momentum modes of the plurality of orbital angular momentum modes based at least in part on determining the one or more signal strength measurements.

17. The method of claim 16, wherein transmitting the feedback message comprises:
transmitting a total signal strength for the selected one or more orbital angular momentum modes in the feedback message.

18. The method of claim 11, further comprising:
receiving the one or more signals using a plurality of receiver circles of the first device based at least in part on the monitoring, the plurality of receiver circles corresponding to the plurality of orbital angular momentum modes;
determining a respective signal strength measurement for each of the plurality of orbital angular momentum modes based at least in part on receiving the one or more signals; and
transmitting the respective signal strengths for each of the plurality of orbital angular momentum modes in the feedback message.

19. An apparatus for wireless communications at a first device, comprising:
a processor;
memory coupled with the processor; and
instructions stored in the memory and executable by the processor to cause the apparatus to:
select, from a plurality of orbital angular momentum modes, a subset of orbital angular momentum modes for a transmit diversity scheme associated with com- munications between the first device and a second device, the subset comprising a first orbital angular momentum mode of the plurality of orbital angular momentum modes and a second orbital angular momentum mode of the plurality of orbital angular momentum modes;
transmit, to the second device, an indication of the transmit diversity scheme associated with commu- nications between the first device and the second device, the transmit diversity scheme indicating the subset of orbital angular momentum modes; and
transmit, based at least in part on the transmit diversity scheme, a data packet to the second device using a set of transmitter circles of the first device, the set of transmitter circles corresponding to both the first orbital angular momentum mode and the second orbital angular momentum mode.

20. The apparatus of claim 19, wherein the instructions are further executable by the processor to cause the appa- ratus to:
receive, from the second device, a feedback message for the data packet, the feedback message indicating a signal strength of the data packet and one or more orbital angular momentum modes for the transmit diversity scheme.

21. The apparatus of claim 19, wherein the instructions are further executable by the processor to cause the appa- ratus to:
transmit a control message corresponding to the data packet, the control message instructing the second device to provide feedback for the data packet based at least in part on the first orbital angular momentum mode and the second orbital angular momentum mode.

22. The apparatus of claim 21, wherein the instructions are further executable by the processor to cause the appa- ratus to:
receive, from the second device, a feedback message for the data packet, the feedback message indicating a signal strength of the data packet for a combination of the first orbital angular momentum mode and the second orbital angular momentum mode.

23. The apparatus of claim 19, wherein the instructions are further executable by the processor to cause the appa- ratus to:
transmit a control message corresponding to the data packet, the control message indicating the transmit diversity scheme for transmission of the data packet.

24. The apparatus of claim 19, wherein the instructions are further executable by the processor to cause the appa- ratus to:
transmit one or more signals using a plurality of trans- mitter circles of the first device, the plurality of trans- mitter circles corresponding to the plurality of orbital angular momentum modes; and
receive, from the second device, a feedback message for the one or more signals, the feedback message indicat- ing a combination of one or more orbital angular momentum modes of the plurality of orbital angular momentum modes and a signal strength corresponding to the combination of the one or more orbital angular momentum modes.

25. An apparatus for wireless communications at a first device, comprising:
a processor;
memory coupled with the processor; and
instructions stored in the memory and executable by the processor to cause the apparatus to:
receive, from a second device, an indication of the transmit diversity scheme associated with commu- nications between the first device and the second device, the transmit diversity scheme indicating a plurality of orbital angular momentum modes for one or more signals from the first device;
monitor for the one or more signals from the first device based at least in part on the transmit diversity scheme; and
transmit a feedback message to the second device based at least in part on the monitoring, the feedback message indicating one or more signal strength mea- surements for one or more orbital angular momentum modes of the plurality of orbital angular momentum modes, the one or more signal strength measurements 16 associated with the one or more signals.

26. The apparatus of claim 25, wherein the instructions to transmit the feedback message are executable by the processor to cause the apparatus to:

transmit a total signal strength of the one or more signals for a combination of multiple orbital angular momentum modes of the plurality of orbital angular momentum modes.

27. The apparatus of claim 25, wherein the instructions are further executable by the processor to cause the apparatus to:

receive a control message for a data packet, the control message instructing the second device to provide feedback for the data packet based at least in part on a combination of a first orbital angular momentum mode and a second orbital angular momentum mode of the plurality of orbital angular momentum modes, wherein the one or more signal strength measurements for the one or more orbital angular momentum modes correspond to the combination of the first orbital angular momentum mode and the second orbital angular momentum mode.

28. The apparatus of claim 27, wherein the control message comprises the indication of the transmit diversity scheme.

29. The apparatus of claim 25, wherein the instructions are further executable by the processor to cause the apparatus to:

receive a control message for a data packet, the control message comprising the indication of the transmit diversity scheme.

30. The apparatus of claim 25, wherein the instructions are further executable by the processor to cause the apparatus to:

receive the one or more signals using a plurality of receiver circles of the first device based at least in part on the monitoring, the plurality of receiver circles corresponding to the plurality of orbital angular momentum modes;

determine the one or more signal strength measurements for the one or more signals based at least in part on receiving the one or more signals; and select the one or more orbital angular momentum modes of the plurality of orbital angular momentum modes based at least in part on determining the one or more signal strength measurements.

\* \* \* \* \*